US010407792B2

(12) United States Patent
Rose et al.

(10) Patent No.: US 10,407,792 B2
(45) Date of Patent: Sep. 10, 2019

(54) METHODS OF THREE-DIMENSIONAL ELECTROPHORETIC DEPOSITION FOR CERAMIC AND CERMET APPLICATIONS AND SYSTEMS THEREOF

(71) Applicant: Lawrence Livermore National Security, LLC, Livermore, CA (US)

(72) Inventors: Klint Aaron Rose, Alviso, CA (US); Joshua D. Kuntz, Livermore, CA (US); Marcus Worsley, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 192 days.

(21) Appl. No.: 15/236,313

(22) Filed: Aug. 12, 2016

(65) Prior Publication Data

US 2016/0355944 A1 Dec. 8, 2016

Related U.S. Application Data

(62) Division of application No. 13/085,405, filed on Apr. 12, 2011, now Pat. No. 9,453,289.

(Continued)

(51) Int. Cl.
*C25D 13/02* (2006.01)
*B33Y 10/00* (2015.01)
(Continued)

(52) U.S. Cl.
CPC .............. *C25D 13/02* (2013.01); *B33Y 10/00* (2014.12); *C04B 37/001* (2013.01);
(Continued)

(58) Field of Classification Search
None
See application file for complete search history.

(56) References Cited

U.S. PATENT DOCUMENTS 3,804,034 A  4/1974 Stiglich, Jr.
4,464,206 A  8/1984 Kumar et al.
(Continued)

FOREIGN PATENT DOCUMENTS

DE  102008027418 A1  12/2009
EP       1009802 A2   6/2000
(Continued)

OTHER PUBLICATIONS

Nagarajan et al., "Nickel-Alumina Functional Graded Materials by Electrophoretic Deposition", J. Am. Ceram. Soc. 87 (11) 2053-2057, 2004.*
(Continued)

*Primary Examiner* — Kishor Mayekar
(74) *Attorney, Agent, or Firm* — Zilka-Kotab

(57) ABSTRACT

In one embodiment, a method for forming a ceramic, metal, or cermet includes: providing a first solution comprising a first solvent and a first material to a device including an electrophoretic deposition (EPD) chamber; applying a voltage difference across a first electrode and a second electrode of the device; electrophoretically depositing the first material above the first electrode to form a first layer; introducing a second solution including a second solvent and a second material to the EPD chamber; applying a voltage difference across the first electrode and the second electrode; and electrophoretically depositing the second material above the first electrode to form a second layer. The first layer has a first composition, a first microstructure, and a first density, while the second layer has a second composition, a second microstructure, and a second density. At least one of the foregoing features of the first and second layers are different.

18 Claims, 8 Drawing Sheets

Related U.S. Application Data

(60) Provisional application No. 61/323,697, filed on Apr. 13, 2010.

(51) Int. Cl.
    C04B 37/02    (2006.01)
    C25D 13/22    (2006.01)
    C25D 13/20    (2006.01)
    C04B 37/00    (2006.01)
    C25D 13/12    (2006.01)

(52) U.S. Cl.
CPC ............ *C04B 37/025* (2013.01); *C25D 13/12* (2013.01); *C25D 13/20* (2013.01); *C25D 13/22* (2013.01); *C04B 2235/5296* (2013.01); *C04B 2235/775* (2013.01); *C04B 2235/787* (2013.01); *C04B 2235/9653* (2013.01); *C04B 2237/083* (2013.01); *C04B 2237/32* (2013.01); *C04B 2237/402* (2013.01); *Y10T 428/12458* (2015.01); *Y10T 428/24802* (2015.01); *Y10T 428/24992* (2015.01); *Y10T 428/252* (2015.01)

(56) References Cited

U.S. PATENT DOCUMENTS

| | | | |
|---|---|---|---|
| 5,096,862 | A | 3/1992 | Mathers et al. |
| 5,476,878 | A | 12/1995 | Pekala |
| 6,001,251 | A | 12/1999 | Asher et al. |
| 6,114,048 | A | 9/2000 | Jech et al. |
| 6,355,420 | B1 | 3/2002 | Chan |
| 7,048,963 | B2 | 5/2006 | Braithwaite et al. |
| 7,368,044 | B2 | 5/2008 | Cohen et al. |
| 7,471,362 | B1 | 12/2008 | Jones |
| 7,776,682 | B1 | 8/2010 | Nickel et al. |
| 8,685,287 | B2 | 4/2014 | Worsley et al. |
| 8,703,523 | B1 | 4/2014 | Biener et al. |
| 8,809,230 | B2 | 8/2014 | Worsley et al. |
| 8,968,865 | B2 | 3/2015 | Worsley et al. |
| 9,290,855 | B2 | 3/2016 | Worsley et al. |
| 9,453,289 | B2 | 9/2016 | Rose et al. |
| 9,852,824 | B2 | 12/2017 | Worsley et al. |
| 2002/0119455 | A1 | 8/2002 | Chan |
| 2003/0141618 | A1 | 7/2003 | Braithwaite et al. |
| 2003/0178307 | A1* | 9/2003 | Sarkar .............. C04B 38/00 204/483 |
| 2004/0216486 | A1 | 11/2004 | Schwertfeger et al. |
| 2004/0217010 | A1 | 11/2004 | Hu et al. |
| 2005/0019488 | A1 | 1/2005 | Braithwaite et al. |
| 2005/0208121 | A1 | 9/2005 | Barton et al. |
| 2005/0255304 | A1 | 11/2005 | Brink |
| 2005/0285291 | A1 | 12/2005 | Ku et al. |
| 2006/0099135 | A1 | 5/2006 | Yodh et al. |
| 2006/0159722 | A1 | 7/2006 | Braithwaite et al. |
| 2006/0228401 | A1 | 10/2006 | Braithwaite et al. |
| 2006/0249388 | A1 | 11/2006 | Chang et al. |
| 2006/0289310 | A1 | 12/2006 | Matson et al. |
| 2007/0095666 | A1* | 5/2007 | Lau ................... B03C 11/00 204/450 |
| 2007/0282439 | A1 | 12/2007 | Zehbe et al. |
| 2008/0006574 | A1 | 1/2008 | Ramaswamy et al. |
| 2009/0002617 | A1 | 1/2009 | Jones |
| 2009/0020924 | A1 | 1/2009 | Lin |
| 2009/0036557 | A1 | 2/2009 | Ratke et al. |
| 2009/0189315 | A1 | 7/2009 | Gunster et al. |
| 2009/0228115 | A1 | 9/2009 | Liu et al. |
| 2009/0288952 | A1 | 11/2009 | Olevsky et al. |
| 2010/0074787 | A2 | 3/2010 | Neirinck et al. |
| 2010/0105539 | A1 | 4/2010 | Hollingsworth et al. |
| 2010/0167907 | A1 | 7/2010 | Lee et al. |
| 2010/0230629 | A1 | 9/2010 | Yu et al. |
| 2011/0014258 | A1 | 1/2011 | Gan et al. |
| 2011/0024698 | A1 | 2/2011 | Worsley et al. |
| 2011/0104491 | A1 | 5/2011 | Shaw et al. |
| 2011/0250467 | A1 | 10/2011 | Rose et al. |
| 2012/0052511 | A1 | 3/2012 | Worsley et al. |
| 2012/0133428 | A1 | 5/2012 | Forbes et al. |
| 2012/0269218 | A1 | 10/2012 | Worsley et al. |
| 2012/0308622 | A1 | 12/2012 | Clarkson et al. |
| 2013/0004761 | A1 | 1/2013 | Worsley et al. |
| 2013/0078476 | A1 | 3/2013 | Riman et al. |
| 2016/0348262 | A1 | 12/2016 | Rose et al. |

FOREIGN PATENT DOCUMENTS

| | | |
|---|---|---|
| EP | 1234207 A1 | 8/2002 |
| EP | 2103719 A1 | 9/2009 |
| WO | 9409048 A1 | 4/1994 |
| WO | 9835012 A2 | 8/1998 |
| WO | 9918892 A1 | 4/1999 |
| WO | 0140853 A1 | 6/2001 |
| WO | 2004050134 A2 | 6/2004 |
| WO | 2007092363 A2 | 8/2007 |
| WO | 2008021191 A2 | 2/2008 |
| WO | 2011053598 A1 | 5/2011 |

OTHER PUBLICATIONS

Laghzizil et al., "Comparison of Electrical Properties between Fluoroapatite and Hydroxyapatite Materials," Journal of Solid State Chemistry, vol. 156, No. 1, Jan. 2001, pp. 57-60.

Laghzizil et al., "Correlation Between Electrical and Structural Properties of Fluorapatites," Phosphorous Research Bulletin, vol. 10, 1999, pp. 381-386.

Final Office Action from U.S. Appl. No. 13/180,440, dated Jul. 14, 2017.

Non-Final Office Action from U.S. Appl. No. 15/236,308, dated Nov. 7, 2018.

Alon Optical Ceramic, "Surmet Engineering Better Material Solutions," 2018, 3 pages, retrieved from http://www.surmet.com/technology/alon-optical-ceramics/index.php.

Cristea et al., "Properties of tantalum oxynitride thin films produced by magnetron sputtering: The influence of processing parameters," 2013, 7 pages, retrieved from http://recipp.ipp.pt/bitstream/10400.22/3479/4/ARTDCristea_2013_DFI.pdf.

Holstein et al., "Reorienation of a Liquid Crystalline Side-chain Polymer in Electric and Magnetic Fields Investigated by Solid-State 1H-NMR," Polymers for Advanced Technologies, Polym. Adv. Technol. vol. 9, 1998, pp. 659-664.

Horike et al., "Soft Porous Crystals," Nature Chemistry, vol. 1, No. 9, abstract only, 2009, pp. 695-704.

Huang et al., "Electromechanical Response in Liquid Crystal Gels and Networks," Smart Structures and Materials 2003: Electroactive Polymer Actuators and Devices (EAPAD), vol. 5051, 2003, pp. 496-503.

Ishikawa et al., "Formation Process of Three-Dimensional Arrays from Silica Spheres," Materials, Interfaces, and Electrochemical Phenomena, AIChE Journal, vol. 49, No. 5, 2003, pp. 1293-1299.

Jin, J., "Advanced Polymers for Emerging Technologies" The News Magazine of the International Union of Pure and Applied Chemistry (IUPAC), vol. 29, No. 3, May-Jun. 2007, pp. 29-30.

John Wiley & Sons, "Definitions," Hawley's Condensed Chemical Dictionary, http://onlinelibrary.wiley.com/mrw/advanced/search?doi=1 0.1 002/9780470114735, Jan. 2007, pp. 1-3.

Jun et al., "Synthesis and Characterizations of Monodispersed Micron-Sized Polyaniline Composite Particles for Electrorheological Fluid Materials," Colloid and Polymer Science, vol. 280, 2002, pp. 744-750.

Kacprzyk, "Polarization of Porous PE Foil," 11th International Symposium of Electrets, 2002, pp. 207-210.

Kaya, "A1203-Y-TZP/A1203 functionally graded composites of tubular shape from nano-sols using double-step electrophoretic deposition," Journal of the European Ceramic Society, vol. 23, No. 10, 2003, pp. 1655-1660.

Kontopoulou et al., "Electrorheological Properties of PDMS/Carbon Black Suspensions Under Shear Flow," Rheologica Acta, vol. 48, No. 4, 2009, pp. 409-421.

(56) References Cited

OTHER PUBLICATIONS

Kurabayashi et al., "Anisotropic Thermal Energy Transport in Polarized Liquid Crystalline (LC) Polymers Under Electric Fields," Microscale Thermophysical Engineering, vol. 7, No. 2, 2003, pp. 87-99.
Legge et al., "Memory Effects in Liquid Crystal Elastomers," Journal of Physics II, vol. 1, Oct. 1991, pp. 1253-1261.
Li et al., "The control of crystal orientation in ceramics by imposition of a high magnetic field," Materials Science and Engineering A, vol. 422, 2006, pp. 227-231.
Liu et al., "Controlled Deposition of Crystalline Organic Semiconductors for Field-Effect-Transistor Applications," Advanced Materials, vol. 21, No. 12, 2009, pp. 1217-1232.
Martin, D., "Controlled Local Organization of Lyotropic Liquid Crystalline Polymer Thin Films with Electric Fields," Polymer, vol. 43, No. 16, 2002, pp. 4421-4436.
Martins et al., "Theory and Numerical Simulation of Field-Induced Director Dynamics in Confined Nematics Investigated by nuclear magnetic resonance," Liquid Crystals, vol. 37, No. 6-7, Jun.-Jul. 2010 pp. 747-771.
Matsen, M., "Electric Field Alignment in Thin Films of Cylinder-Forming Diblock Copolymer," Macromolecules, vol. 39, No. 16, 2006, pp. 5512-5520.
Moon et al., "Triply Periodic Bicontinuous Structures as Templates for Photonic Crystals: A Pinch-off Problem," Advanced Materials, vol. 19, 2007, pp. 1510-1514.
Moritz et al., "Electrophoretically deposited porous ceramics and their characterisation by X-ray computer tomography," Key Engineering Materials, vol. 412, 2009, pp. 255-260.
Moritz et al., "ZrO2 ceramics with aligned pore structure by EPD and their characterisation by X-ray computed tomography," Journal of the European Ceramic Society, vol. 30, 2010, pp. 1203-1209.
Moritz et al., "Electrophoretic deposition of ceramic powders—influence of suspension and processing parameters," Key Engineering Materials, vol. 314, Jan. 2006, pp. 51-56.
Motyl et al., "Piezoelectric Properties of PZT-HFPP Composites," Scientific Papers of the Institute of Electrical Engineering Fundamentals of the Wroclaw University of Technology, No. 40, Conference 15, 2004, pp. 312-314.
Neves et al., "Experimental Results on Electrorheology of Liquid Crystalline Polymer Solutions," American Institute of Physics Conference Proceedings, vol. 1027, 2008, pp. 1429-1431.
Nicolay et al., "Physical Characterisation of Transparent PLZT Ceramics Prepared by Electrophoretic Deposition," Ceramic Engineering and Science Proceedings, vol. 25, No. 3, pp. 129-134.
Novak et al., "Infiltration of a 3-D Fabric for the Production of SiC/SiC Composites by Means of Electrophoretic Deposition," Key Engineering Materials, vol. 412, 2009, pp. 237-242.
Oetzel et al., "Preparation of zirconia dental crowns via electrophoretic deposition," Journal of Materials Science, vol. 41, No. 81, 2006, pp. 8130-8137.
O'Grady et al., "Optimization of Electroactive Hydrogel Actuators," Applied Materials & Interfaces, vol. 2, No. 2, 2010, pp. 343-346.
Olevsky et al., "Fabrication of Net-Shape Functionally Graded Composites by Electrophoretic Deposition and Sintering: Modeling and Experimentation," Journal of the American Ceramic Society, vol. 90, No. 10, 2007, pp. 3047-3056.
Olevsky et al., "Fabrication of Tailored Powder Structures by Electrophoretic Deposition and Sintering," Key Engineering Materials, vol. 434-435, 2010, pp. 757-760.
Olszowka et al., "3-Dimensional Control Over Lamella Orientation and Order in Thick Block Copolymer Films," Soft Matter, vol. 5, No. 4, 2009, pp. 812-819.
Perry et al., "Phase Characterization of Partially Stabilized Zirconia by Raman Spectroscopy," Journal of American Ceramics Society, vol. 68, No. 8, Aug. 1985, pp. C-184/C-187.
Put et al., "Gradient Profile Prediction in Functionally Graded Materials Processed by Electrophoretic Deposition," Acta Materialia, vol. 51, No. 20, 2003, pp. 6303-6317.
Ridler et al., "Electrofluorescence of Dye-Tagged Polynucleotides," Polymer, vol. 37, No. 22, 1996, pp. 4953-4960.
Rohman et al., "Design of Porous Polymeric Materials from Interpenetrating Polymer Networks (IPNs): Poly(DL-lactide)/poly(methyl methacrylate)-based semi-IPN systems," Macromolecules, vol. 38, No. 17, 2005, pp. 7274-7285.
Rohman et al., "Poly(d,l-lactide)/poly{methyl methacrylate} interpenetrating polymer networks: Synthesis, Characterization, and Use as Precursors to Porous polymeric materials," Polymer, vol. 48, No. 24, 2007, pp. 7017-7028.
Rozanski, "Electrooptical Properties of a Nematic Liquid Crystal Adsorbed in Cellulose Membrane," Synthetic Metals, vol. 109, No. 1-3, 2000, pp. 245-248.
Ryan et al., "Electric-Field-Assisted Assembly of Perpendicularly Oriented Nanorod Superlattices," Nano Letters, vol. 6, No. 7, 2006, pp. 1479-1482.
Ryan et al., "Vertical Aligned Nanorod Assembly by Electrophoretic Deposition from Organic Solvents," Materials Research Society Symposium Proceedings, vol. 1121, 2009, pp. 36-40.
Ryoo et al., "Ordered Mesoporous Carbons," Adv. Mater., vol. 13, No. 9, May 3, 2001, pp. 677-681.
Santillan et al., "Electrophoretic Codeposition of LaO.6Sr0.4CoO.8FeO.203-delta and Carbon Nanotubes for Developing Composite Cathodes for Intermediate Temperature Solid Oxide Fuel Cells," International Journal of Applied Ceramic Technology, vol. 7, Issue 1, 2010, pp. 30-40.
Shimura et al., "Electric-Field-Responsive Lithium-Ion Conductors of Propylenecarbonate-Based Columnar Liquid Crystals," Advanced Materials, vol. 21, 2009, pp. 1591-1594.
Shirai et al., "Structural Properties and Surface Characteristics on Aluminum Oxide Powders," Ceramics Research Laboratory, vol. 9, 2009, pp. 23-31.
Song et al., "Overlap Integral Factor Enhancement Using Buried Electrode Structure in Polymer Mach-Zehnder Modulator," Applied Physics Letter, vol. 92, No. 3, 2008, pp. 031103-1-031103-3.
Sun et al., "Graded/Gradient Porous Biomaterials," Materials, vol. 3, 2010, pp. 26-47.
Tabellion et al., "Electrophoretic Deposition from Aqueous suspensions for near-shape manufacturing of advanced ceramics and glasses—applications," Journal of Materials Science, vol. 39, No. 3, 2004, pp. 803-811.
Tabellion et al., "Shaping of Bulk Glasses and Ceramics with Nanosized Particles," Synthesis and Processing of Nanostructured Materials, Nov. 2006, pp. 129-136.
Takahashi et al., "Growth and Electrochemical Properties of Single-Crystalline V2O5 Nanorod Arrays," The Japan Society of Applied Physics, vol. 44, No. 1B, 2005, pp. 662-668.
Tehrani et al., "Effect of Low Field Magnetic Annealing on the Viscoelastic Behavior of a Structural Epoxy," Proceedings of the ASME 2009 International Mechanical Engineering Congress & Exposition, Nov. 13-19, 2009, pp. 1-8.
Tian et al., "Complex and oriented ZnO nanostructures," Natural Materials, vol. 2, No. 12, Dec. 2003, pp. 821-826.
Tsori et al., "Block Copolymers in Electric Fields: A Comparison of Single-Mode and Self-Consistent-Field Approximations," Macromolecules, vol. 39, No. 1, 2006, pp. 289-293.
Tsori et al., "Orientational Transitions in Symmetric Diblock Copolymers on Rough Surfaces," Macromolecules, vol. 38, Apr. 2005, pp. 7193-7196.
Valentini et al., "Anisotropic Electrical Transport Properties of Aligned Carbon Nanotube/PMMA Films Obtained by Electric-Field-Assisted Thermal Annealing," Macromolecular Materials and Engineering, vol. 293, No. 11, 2008, pp. 867-871.
Van Der Biest et al., "Laminated and functionally graded ceramics by electrophoretic deposition," Trans Tech Publications, Key Engineering Materials, vol. 333, 2007, pp. 49-58.
Van Der Biest et al., "Electrophoretic shaping of free standing objects," Electrophoretic Deposition: Fundamentals and Applications, Electrochemical Society Proceedings vol. 2002-21, 2002, pp. 62-69.
Vleugels et al., "Thick Plate-Shaped A12O3/ZrO2 Composites with Continuous Gradient Processed by Electrophoretic Deposition," Materials Science Forum, vol. 423-425, 2003, p. 171-176.

(56) References Cited

OTHER PUBLICATIONS

Wakefield et al., "Three-Dimensional Alignment of Liquid Crystals in Nanostructured Porous Thin Films," Proceedings of SPIE, vol. 6654, 2007, pp. 1-15.
Wegener et al., "Porous Polytetraftuoroethylene (PTFE) Electret Films: porosity and time dependent charging behavior of the free surface," Journal of Porous Materials, vol. 14, No. 1, Dec. 2006, pp. 111-118.
Wolff et al., "Preparation of polycrystalline ceramic compacts made of alumina powder with a bimodal particle size distribution for hot isostatic pressing," Ceramic Engineering and Science Proceedings, American Ceramic Society, vol. 24, 2003, pp. 81-86.
Xu et al., "Fast and Controlled Integration of Carbon Nanotubes into Microstructures," Materials Research Society Symposium Proceedings, vol. 1139, 2009, pp. 59-64.
Zaman et al., "3-D micro-ceramic components from hydrothermally processed carbon nanotube-boehmite powders by electrophoretic deposition," Ceramics International, vol. 36, 2010, pp. 1703-1710.
Zorn et al.. "Orientation and Dynamics of ZnO Nanorod Liquid Crystals in Electric Fields." Macromolecular Rapid Communications, vol. 31, No. 12, 2010, pp. 1101-1107.
Final Office Action from U.S. Appl. No. 13/453,933, dated Oct. 23, 2015.
Advisory Action from U.S. Appl. No. 13/180,440, dated Oct. 19, 2015.
Notice of Allowance from U.S. Appl. No. 13/453,933, dated Feb. 3, 2016.
Final Office Action from U.S. Appl. No. 13/085,405, dated Mar. 1, 2016.
Notice of Allowance from U.S. Appl. No. 13/085,405, dated May 19, 2016.
Rose et al., U.S. Appl. No. 15/236,308, filed Aug. 12, 2016.
Non-Final Office Action from U.S. Appl. No. 13/180,440, dated Dec. 30, 2016.
Notice of Allowance from U.S. Appl. No. 13/180,440, dated Sep. 27, 2017.
Restriction Requirement from U.S. Appl. No. 15/236,308, dated Apr. 20, 2018.
Rose et al., U.S. Appl. No. 13/085,405, filed Apr. 12, 2011.
Election/Restriction Requirement from U.S. Appl. No. 13/085,405, dated May 10, 2013.
Non-Final Office Action from U.S. Appl. No. 13/085,405, dated Sep. 12, 2013.
Final Office Action from U.S. Appl. No. 13/085,405, dated Apr. 8, 2014.
Non-Final Office Action from U.S. Appl. No. 13/085,405, dated Feb. 27, 2015.
Non-Final Office Action from U.S. Appl. No. 13/085,405, dated Jul. 21, 2015.
Worsley et al., U.S. Appl. No. 13/180,440, filed Jul. 11, 2011.
Election/Restriction Requirement from U.S. Appl. No. 13/180,440, dated Jun. 19, 2014.
Non-Final Office Action from U.S. Appl. No. 13/180,440, dated Dec. 5, 2014.
Final Office Action from U.S. Appl. No. 13/180,440, dated Jul. 31, 2015.
Worsley et al., U.S. Appl. No. 13/453,933, filed Apr. 23, 2012.
Election/Restriction Requirement from U.S. Appl. No. 13/453,933, dated Apr. 4, 2014.
Non-Final Office Action from U.S. Appl. No. 13/453,933, dated Jul. 10, 2014.
Final Office Action from U.S. Appl. No. 13/453,933, dated Dec. 12, 2014.
Non-Final Office Action from U.S. Appl. No. 13/453,933, dated May 20, 2015.
Ahmed et al., "Centimetre scale assembly of vertically aligned and close packed semiconductor nanorods from solution," Chem. Commun., 2009, pp. 6421-6423.
Akerman, B., "Barriers Against DNA-Loop Formation in a Porous Matrix," Physical Review, E, Statistical Physics, Plasmas, Fluids, and Related Interdisciplinary Topics, vol. 54, No. 6, 1996, pp. 6685-6696, abstract only.
Angelescu et al., "Enhanced Order of Block Copolymer Cylinders in Single-Layer Films Using a Sweeping Solidification Front," Advanced Materials, vol. 19, No. 18, 2007, pp. 2687-2690.
Anklam et al., "Electric-Field-Induced Rupture of Polymer-Stabilized Oil Films," Colloid Polym. Sci., vol. 277, 1999, pp. 957-964.
Anne et al., "Electrophorectic Deposition as a Novel Near Net Shaping Technique for Functionality Graded Biomaterials," Materials Science Forum, vol. 492-493, 2005, pp. 213-218.
Anne et al., "Engineering the Composition Profile in Functionally Graded Materials Processed by Electrophoretic Deposition," Innovative Processing and Synthesis of Ceramics, Glasses and Composites IX, vol. 177, 2006, pp. 45-52.
Banda et al., "Electric Field-Assisted Processing of Anisotropic Polymer Nanocomposites," ASME 2007 International Mechanical Engineering Congress and Exposition (IMECE2007), vol. 13, Nov. 11-15, 2007, pp. 1-5.
Bartscherer et al., "Improved Preparation of Transparent PLZT Ceramics by Electrophoretic Deposition and Hot Isostatic Pressing," Ceramic Engineering and Science Proceedings, vol. 24, 2003, pp. 169-174.
Besra et al., "A review on fundamentals and applications of electrophoretic deposition (EPD)," Science Direct, Progress in Materials Science, vol. 52, 2007, pp. 1-61.
Baumann et al., "High surface area carbon aerogel monoliths with hierarchical porosity," Journal of Non-Crystalline Solids, vol. 354, 2008, pp. 3513-3515.
Baumann et al., "Template-directed synthesis of periodic macroporous organic and carbon aerogels," Journal of Non-Crystalline Solids, vol. 350, 2004, pp. 120-125.
Bobrovsky et al., "New photosensitive polymer composites based on oriented porous polyethylene filled with azobenzene-containing LC mixture: reversible photomodulation of dichroism and birefringence," Liquid Crystals, vol. 35, No. 5, May 2008, pp. 533-539.
Boccaccini et al., "The Use of Electrophoretic Deposition for the Fabrication of Ceramic and Glass Matrix Composites," Advances in Ceramic Matrix Composites IX, American Ceramic Society, 2004, pp. 57-66.
Boccaccini, A., "The Use of Electrophoretic Deposition for the Fabrication of Ceramic Matrix Composites," Advanced Materials Forum, Trans Tech Publications Ltd., vol. 455-456, 2004, pp. 221-225.
Bouchet et al., "Contactless Electrofunctionalization of a Single Pore," Small, vol. 5, No. 20, 2009, pp. 2297-2303.
Braun et al., "Transparent Alumina Ceramics With Sub-Microstructure by Means of Electrophoretic Deposition," Developments in Advanced Ceramics and Composites, American Ceramic Soc., vol. 26, 2005, pp. 97-104.
Braun et al., "Transparent Polycrystalline Alumina Ceramic with Sub-Micrometre Microstructure by Means of Electrophoretic Deposition," Materialwissenschaft und Werkstofflechnik, 2006, vol. 37, No. 4, pp. 293-297.
Bock et al., "Structural Investigation of Resorcinol Formaldehyde and Carbon Aerogels Using SAXS and BET," Journal of Porous Materials, vol. 4, 1997, pp. 287-294.
Buscaglia et al., "Memory effects in nematics with quenched disorder," The American Physical Society, Physical Review E, vol. 74, No. 1, 2006, pp. 011706-1-011706-8.
Butsko et al., "The Formation of Polysilicic Acid Gels in an Electric Field: The Properties of Acidic Xerogels," Colloid Journal of the USSR, vol. 35, No. 2, 1973, pp. 303-307.
Chao et al., "Orientational Switching of Mesogens and Microdomains in Hydrogen-Bonded Side-Chain Liquid-Crystalline Block Copolymers Using AC Electric Fields," Advanced Functional Materials, vol. 14, No. 4, 2004, pp. 364-370.
Chen et al., "'Investigation on the electrophoretic deposition of a FGM piezoelectric monomorph actuator," Journal of Materials Science, vol. 38, No. 13, 2003, pp. 2803-2807.

(56) References Cited

OTHER PUBLICATIONS

Cho et al., "Anisotropic alignment of non-modified Bn nanosheets in polysiloxane matrix under nano pulse width electricity," Journal of the Ceramic Society of Japan, vol. 118, No. 1, 2010, pp. 66-69.

Clasen et al., "Near net shaping with bimodal powders on shaped membranes via EPD," Key Engineering Materials, vol. 412, 2009, pp. 45-50.

Crossland et al., "Control of gyroid forming block copolymer templates: effects of an electric field and surface topography," Soft Matter, vol. 6, No. 3, 2010, pp. 670-676.

De Rosa et al., "Microdomain patterns from directional eutectic solidification and epitaxy," Nature, vol. 405, No. 6785, 2000, pp. 433-437, abstract only.

Dziomkina et al., "Layer-by-layer templated growth of colloidal crystals with packing and pattern control," Science Direct, Colloids and Surfaces A: Physicochemical and Engineering Aspects, vol. 342, 2009, pp. 8-15.

Ferrari et al., "Thermogelation of Al2O3/y-TZP films produced by electrophoretic co-deposition," Journal of the European Ceramic Society, vol. 24, 2004, pp. 3073-3080.

Findlay, R., "Microstructure of Side Chain Liquid Crystalline Polymers and their Alignment Using Electric Fields and Surfaces," Molecular Crystals and Liquid Crystals, vol. 231, No. 1, pp. 137-151.

Fukasawa et al., "Pore structure of porous ceramics synthesized from water-based slurry by freeze-dry process," Journal of Materials Science, vol. 36, 2001, pp. 2523-2527.

Hamagami et al., "3D Particle Assembly in Micro-Scale by Using Electrophoretic Micro-Fabrication Technique," Key Engineering Materials, vol. 314, 2006, pp. 7-13.

Hasegawa et al., "Micro-Flow Control and Micropump by Applying Electric Fields through a Porous Membrane," JSME International Journal Series B, vol. 47, No. 3, 2004, pp. 557-563.

Hassanin et al., "Functionally graded microceramic components," Microelectronic Engineering, vol. 87, 2010, pp. 1610-1613.

Hassanin et al., "Infiltration-Processed, Functionally Graded Materials for Microceramic Components," IEEE, 2010, pp. 368-371.

Hatch et al., "Integrated Preconcentration Sds-p. Of Proteins in Microchips Using Photopatterned Cross-Linked Polyacrylamide Gels," Analytical Chemistry, vol. 78, No. 14, 2006, pp. 4976-4984.

Final Office Action from U.S. Appl. No. 15/236,308, dated May 28, 2019.

* cited by examiner

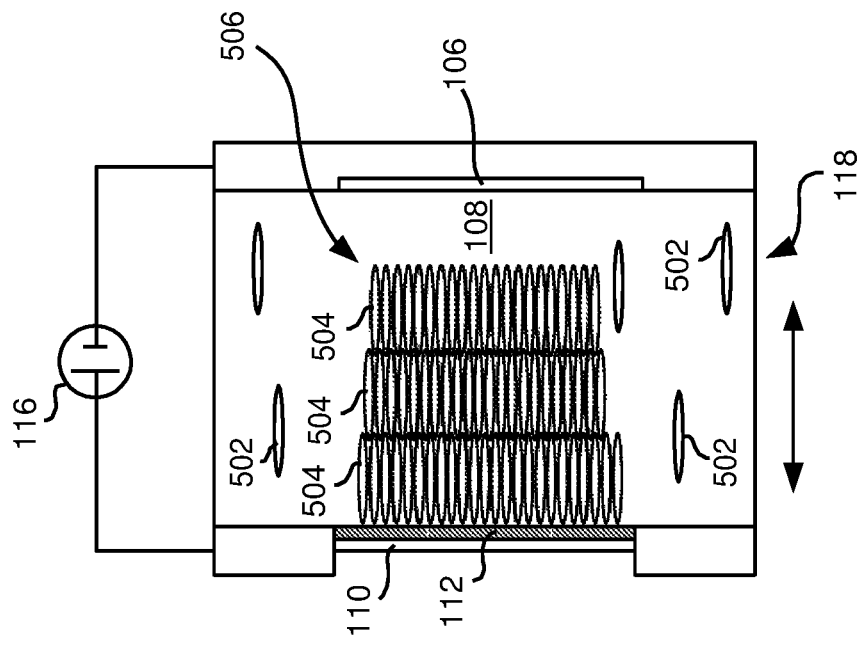
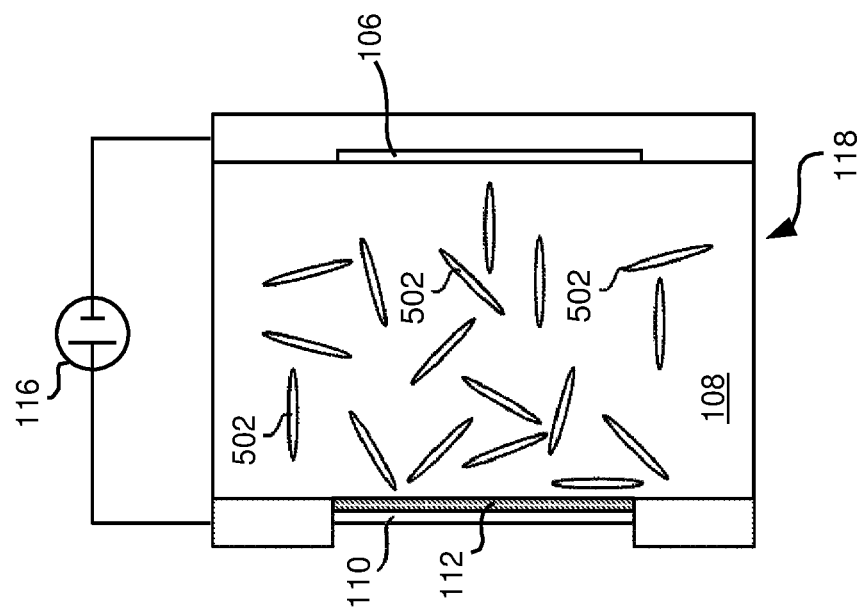

METHODS OF THREE-DIMENSIONAL ELECTROPHORETIC DEPOSITION FOR CERAMIC AND CERMET APPLICATIONS AND SYSTEMS THEREOF

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to functionality graded materials, and more particularly, to using three-dimensional electrophoretic deposition to form functionality graded materials.

BACKGROUND

The electrophoretic deposition (EPD) process utilizes electric fields to deposit charged nanoparticles from a solution onto a substrate. Earlier industrial use of the EPD process employed organic solvent solutions and therefore typically generated hazardous waste as a by-product of the process. In addition, the shapes, compositions, densities, and microstructures of materials formed through EPD processes have typically been difficult if not impossible to control, either separately or in combination with one another. Also, it is extremely difficult to form structures from more than one material. That is to say, typical EPD processes are limited in that they are only capable of forming planar, homogenous structures.

SUMMARY

A ceramic, metal, or cermet according to one embodiment includes a first layer having a gradient in composition, microstructure and/or density in an x-y plane oriented parallel to a plane of deposition of the first layer.

A method for forming a ceramic, metal, or cermet according to one embodiment includes providing light in a first pattern to a photoconductive layer positioned near a transparent or semi-transparent electrode of an electrophoretic deposition (EPD) chamber, wherein the photoconductive layer is positioned between the transparent or semi-transparent electrode and a second electrode, wherein portions of the photoconductive layer become conductive in response to the light according to the first pattern; applying a voltage difference across the transparent or semi-transparent electrode and the second electrode; and electrophoretically depositing a first material above the photoconductive layer according to the first pattern, wherein the EPD chamber comprises an aqueous or organic solution having the first material to be deposited therein.

A ceramic according to another embodiment includes a plurality of layers comprising particles of a non-cubic material, wherein each layer is characterized by the particles of the non-cubic material being aligned in a common direction.

A method for forming a ceramic according to one embodiment includes electrophoretically depositing a plurality of layers of particles of a non-cubic material, wherein the particles of the deposited non-cubic material are oriented in a common direction.

A ceramic, metal, or cermet according to another embodiment includes a first layer having a first composition, a first microstructure, and a first density; and a second layer above the first layer, the second layer having at least one of: a second composition, a second microstructure, and a second density, wherein a gradient exists between the first layer and the second layer, and wherein the first and second layers have a characteristic of being formed in an electrophoretic deposition (EPD) chamber.

A method for forming a ceramic, metal, or cermet according to one embodiment includes providing an electrophoretic deposition (EPD) device comprising: an EPD chamber; a first electrode positioned at an end of the EPD chamber; and a second electrode positioned at an opposite end of the EPD chamber. The method further includes providing a first solution to the EPD chamber using an automated injection system, the first solution comprising a first solvent and a first material; applying a voltage difference across the first electrode and the second electrode; electrophoretically depositing the first material above the first electrode to form a first layer, wherein the first layer has a first composition, a first microstructure, and a first density; introducing a second solution to the EPD chamber using the automated injection system, the second solution comprising a second solvent and a second material; applying a voltage difference across the first electrode and the second electrode; and electrophoretically depositing the second material above the first electrode to form a second layer, wherein the second layer has a second composition, a second microstructure, and a second density, wherein at least one of: the first and second composition are different, the first and second microstructure are different, and the first and second density are different.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 5A-5B show the formation of a ceramic through EPD, according to one embodiment.

DETAILED DESCRIPTION

Figure 1:
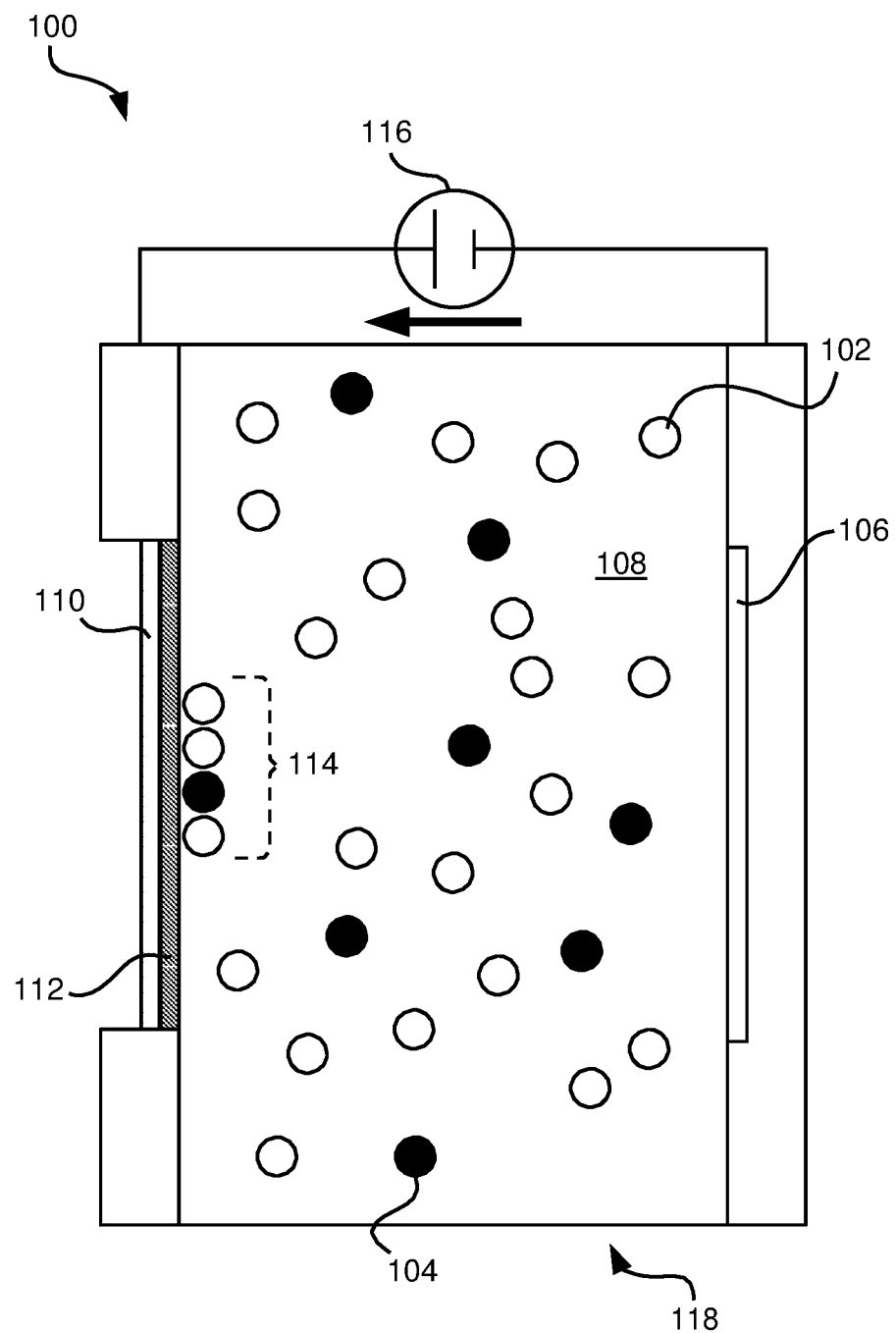
FIG. 1 is a simplified schematic diagram of an electrophoretic deposition (EPD) device, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

Functionally graded materials (FGM) fabricated with gradients in composition, microstructure, and/or density produce enhanced bulk properties, which typically correspond to a combination of the precursor material properties. For example, controlled composite layers of boron carbide and aluminum may produce lightweight ceramic materials that are both hard and ductile for improved armor. Current graded materials are primarily produced by coarse, layered processing techniques or melt-based approaches which are typically limited to abrupt gradients in composition along one axis only. The techniques described herein overcome these limitations using electrophoretic deposition (EPD) technology to fabricate functionally graded, nanostructured materials tailored in three-dimensions.

Typically, EPD has been used for forming coatings on surfaces using organic solvents. Recent nanomaterial work has demonstrated that electrophoretic deposition (EPD) is capable of, at small length scales, being performed using aqueous (water-based) solutions. In addition, EPD may be performed using a wide variety of charged nanoparticles, such as oxides, metals, polymers, semiconductors, diamond, etc.

In one general embodiment, a ceramic, metal, or cermet includes a first layer having a gradient in composition, microstructure and/or density in an x-y plane oriented parallel to a plane of deposition of the first layer.

In another general embodiment, a method for forming a ceramic, metal, or cermet includes providing light in a first pattern to a photoconductive layer positioned near a transparent or semi-transparent electrode of an electrophoretic deposition (EPD) chamber, wherein the photoconductive layer is between the transparent or semi-transparent electrode and a second electrode, wherein portions of the photoconductive layer become conductive in response to the light according to the first pattern, applying a voltage difference across the transparent or semi-transparent electrode and the second electrode, and electrophoretically depositing a first material above the photoconductive layer according to the first pattern, wherein the EPD chamber comprises an aqueous or organic solution having the first material to be deposited therein.

According to another general embodiment, a ceramic includes a plurality of layers comprising particles of a non-cubic material, wherein each layer is characterized by the particles of the non-cubic material being aligned in a common direction.

In yet another general embodiment, a method for forming a ceramic includes electrophoretically depositing a plurality of layers of particles of a non-cubic material, wherein the particles of the deposited non-cubic material are oriented in a common direction.

In another general embodiment, a ceramic, metal, or cermet includes a first layer having a first composition, a first microstructure, and a first density, and a second layer above the first layer, the second layer having at least one of: a second composition, a second microstructure, and a second density, wherein a gradient exists between the first layer and the second layer and the first and second layers have a characteristic of being formed in an EPD chamber.

According to another general embodiment, a method for forming a ceramic, metal, or cermet includes providing an EPD device which includes an EPD chamber, a first electrode positioned at an end of the EPD chamber, and a second electrode positioned at an opposite end of the EPD chamber, providing a first solution to the EPD chamber using an automated injection system, the first solution comprising a first solvent and a first material, applying a voltage difference across the first electrode and the second electrode, electrophoretically depositing the first material above the first electrode to form a first layer, wherein the first layer has a first composition, a first microstructure, and a first density, introducing a second solution to the EPD chamber using the automated injection system, the second solution comprising a second solvent and a second material, applying a voltage difference across the first electrode and the second electrode, and electrophoretically depositing the second material above the first electrode to form a second layer, wherein the second layer has a second composition, a second microstructure, and a second density, wherein at least one of: the first and second composition are different, the first and second microstructure are different, and the first and second density are different.

As shown in FIG. 1, an EPD device 100 may include a first electrode 110 and a second electrode 106 positioned on either side of an EPD chamber 118, with a voltage difference 116 applied across the two electrodes 106, 110 that causes charged nanoparticles 102 and/or 104 in a solvent 108 to move toward the first electrode 110 as indicated by the arrow. In some embodiments, a substrate 112 may be placed on a solution side of the first electrode 110 such that nanoparticles 114 may collect thereon.

The EPD device 100, in some embodiments, may be used to deposit materials to the first electrode 110 or to a conductive or non-conductive substrate 112 positioned on a side of the electrode 110 exposed to a solution 108 including the material 102, 104 to be deposited. By controlling certain characteristics of formation of structures in an EPD process, such as the precursor material composition (e.g., homogenous or heterogeneous nanoparticle solutions) and orientation (e.g., non-spherical nanoparticles), deposition rates (e.g., by controlling an electric field strength, using different solvents, etc.), particle self-assembly (e.g., controlling electric field strength, particle size, particle concentration, temperature, etc.), material layers and thicknesses (e.g., through use of an automated sample injection system and deposition time), and deposition patterns with each layer (e.g., via use of dynamic electrode patterning), intricate and complex structures may be formed using EPD processes that may include a plurality of densities, microstructures, and/or compositions, according to embodiments described herein.

Equation 1 sets out the basic system-level model for electrophoretic deposition, where $W_{film}$ is the mass of the deposition layer, $\mu$ is the electrophoretic mobility, E is the electric field, A is the area of the electrode substrate, C is the deposition particle mass concentration, and t is the deposition time.

$$W_{film} = \int_{t1}^{t2} \mu E A C \, dt \qquad \text{Equation 1}$$

Combining these principles with dynamic patterning and sample delivery (which is described in more detail later), electrophoretic deposition may be employed to produce a diverse set of products with unique and/or difficult to obtain shapes, designs, and properties custom-fitted to any of a number of practical applications.

In one approach, EPD technology may be combined with pattern-oriented deposition in order to effectuate complex two- and three-dimensional patterning structures. In another approach, coordinating sample injection during EPD further enables complex patterning of structures that may include concentration gradients of a deposited material in complex two- and three-dimensional arrangements.

In another approach, multiple materials may be combined during patterning by way of coordinated sample injection in order to effectuate complex electrochemical and structural arrangements. By way of example, this approach may be employed to accomplish sample doping or to form ceramics or composites, such as ceramic metals (cermets).

Similarly, multiple dynamic patterns may be overlaid in combination with dynamic sample injection during the EPD process to generate a layered structure having differing arrangements, densities, microstructures, and/or composition according to any number of factors, including preferences, application requirements, cost of materials, etc.

Figure 2A:
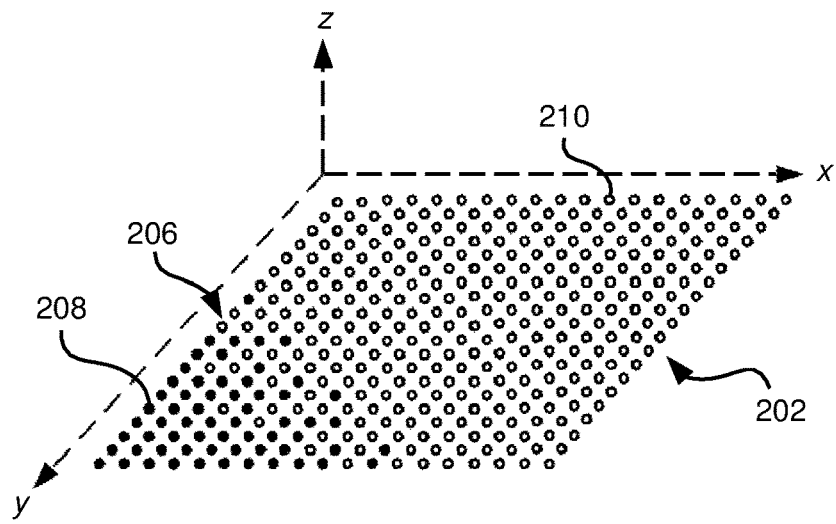
FIGS. 2A-2C show a simplified view of layers of a structure formed through an EPD process, according to one embodiment.
Figure 2B:
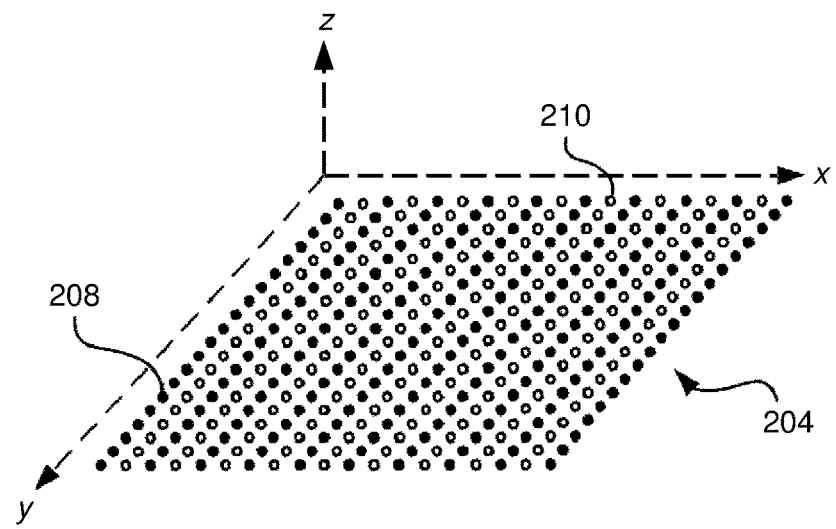
Figure 2C:
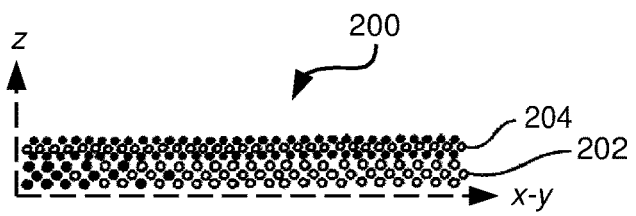

Now referring to FIGS. 2A-2C, according to one embodiment, a ceramic, metal, or cermet 200 comprises a first layer 202 having a gradient 206 in composition, microstructure and/or density in an x-y plane oriented parallel to a plane of deposition of the first layer 202. The gradient of the first layer 202, according to various embodiments, may be smooth, abrupt, or comprised of small, incremental steps.

As shown in FIG. 2A, the x-y plane is represented in an isometric view of a simplified schematic diagram of a single layer 202, which is represented by a plurality of white dots 210 and/or black dots 208. The dots 210 and/or 208 may represent a density of the layer (such as the black dots 208 representing a more dense volume, with the white dots 210 representing a less dense volume), a composition of the layer (such as the black dots 208 representing a first material, with the white dots 210 representing a second material), a microstructure of the layer (such as the black dots 208 representing a first lattice structure, with the white dots 210 representing a second lattice structure), etc. Of course, the embodiments described herein are not meant to be limiting on the invention in any way. Also, the patterns are not limited to those shown in FIGS. 2A and 2B, and may include any shape (polygonal, regular, irregular, etc.), repeating pattern (single pixels, lines, shapes, areas, etc.), random array (e.g., a predefined composition of materials with a random arrangement, such as a 25%/75% material A/material B split, a 50%/50% material A/material B split, etc.), etc.

According to one embodiment, the gradient 206 of the first layer 202 may be defined by a first material 208 being arranged in a first pattern and a second material 210 being arranged in a second pattern, wherein the first pattern is complementary to the second pattern. The term "complementary" indicates that one pattern does not overlay the other pattern, but gaps may remain between the patterns where no material is deposited, in some approaches. In other approaches, the second pattern may be a reverse or negative pattern of the first pattern, e.g., red and black squares of a checker board. Of course, any pattern may be used for the first and second patterns as would be understood by one of skill in the art upon reading the present descriptions, including patterns that are not complementary. In more approaches, the patterns may be changed as material is deposited, causing even more options to material formation, layering, etc.

In another embodiment, at least the first material 208 and/or the first layer 202 may have a characteristic of being deposited through an EPD process according to the first pattern. This characteristic may include, in some embodiments, smooth, gradual gradients between the materials in the first layer 202, abrupt transitions from the first material 208 to the second material 210 in the first layer 202, regular patterning between the first material 208 and the second material 210, or any other characteristic of deposition through an EPD process as would be understood by one of skill in the art upon reading the present descriptions. In a further embodiment, at least the first material 208 may have a characteristic of being deposited through the EPD process above a non-planar electrode. For example, the non-planar electrode may have a cylindrical shape, a regular polygonal shape, a conical shape, a curved surface shape, or any other non-planar shape as would be understood by one of skill in the art upon reading the present descriptions. Non-planar electrodes are described in more detail later.

In another embodiment, the second material 210 may have a characteristic of being deposited through an EPD process, and may further have a characteristic of being deposited above a non-planar electrode, as described later. Moreover, this may include characteristics of the second material being deposited after the first material is deposited.

According to one embodiment, the ceramic, metal, or cermet 200 may further comprise a second layer 204 above the first layer 202, wherein the second layer 204 has a gradient in composition, microstructure and/or density in an x-y plane oriented parallel to a plane of deposition of the second layer 204. The gradient of the second layer 204, according to various embodiments, may be smooth, abrupt, or comprised of small, incremental steps.

In one embodiment, the gradient of the second layer 204 may be defined by the first material 208 being arranged in a third pattern and the second material 210 being arranged in a fourth pattern, wherein the third pattern is complementary to the fourth pattern. Of course, the patterns shown in FIGS. 2A and 2B are not limiting on the invention in any way, and any patterns may be used as would be understood by one of skill in the art upon reading the present descriptions. In some approaches, the first, second, third, and/or fourth patterns may overlay one another and/or be coexistent therewith.

In another embodiment, at least the first material 208, the second material 210 and/or the second layer 204 may have a characteristic of being deposited through an EPD process according to the third pattern. In a further embodiment, at least the first material 208, the second material 210 and/or the second layer 204 may have a characteristic of being deposited through the EPD process above a non-planar electrode, as described previously.

In another embodiment, the first pattern may be different from the third pattern, e.g., each layer may use one or more unique pattern and/or materials, thereby creating a structure which, in the z-direction perpendicular to the x-y plane, may have differing arrangements of materials. Of course, in another embodiment, the second pattern may be different from the fourth pattern.

According to another embodiment, as shown in FIG. 2C, a gradient may exist between the first layer 202 and the second layer 204 in a z-direction perpendicular to the x-y plane of the first layer 202, the gradient being a transition from at least one of: a first composition, a first microstructure, and a first density of the first layer 202 to at least one of: a second composition, a second microstructure, and a second density of the second layer 204, wherein at least one of: the first composition and the second composition are different, the first microstructure and the second microstructure are different, and the first density and the second density are different. This gradient in the z-direction may be used in addition to or in place of a gradient in the x-y plane of each layer based on patterns, e.g., the ceramic, metal, or cermet 200 may be formed by changing solutions in an EPD chamber during EPD processing, in one approach.

According to one proposed use, a high-powered laser may comprise the ceramic 200 as a transparent ceramic optic in the laser.

As would be understood by one of skill in the art upon reading the present descriptions, one or more additional layers may be arranged above the first layer 202 and the second layer 204, thereby forming a structure that may have complex layering and/or composition, with gradients possible in the x-y plane and the z-direction across all the layers.

In one embodiment, EPD may be used in conjunction with controlled electric field patterns to direct the composition of deposited material in an x-y plane parallel to a plane of deposition, including multilayer deposition of a single pattern as well as dynamically changing patterns as the particles build up in the z-dimension, perpendicular to the x-y plane. This technique enables, for example, transparent ceramic optics with a controlled, smooth, x-y concentration of dopant material.

Current optics designs are material and process limited to uniform composition profiles across optical components and laser gain media. To date, only coarse step function composition changes have been produced in the most advanced transparent ceramic optics. However, in one embodiment, because the electrophoretic deposition occurs only where the field is applied, precisely patterned x-y concentration profiles are possible by modifying the electrode pattern in this plane. To enable this capability, one electrode in a typical EPD system may be replaced with a photoconductive layer (such as α-H:Si) and a transparent or semi-transparent electrode, e.g., of indium tin oxide (ITO) and illuminated in specific regions using any number of light sources and/or light altering devices or mechanisms, such as a static mask, a dynamic pattern from a light altering or emitting mechanism, etc.

Figure 3A:
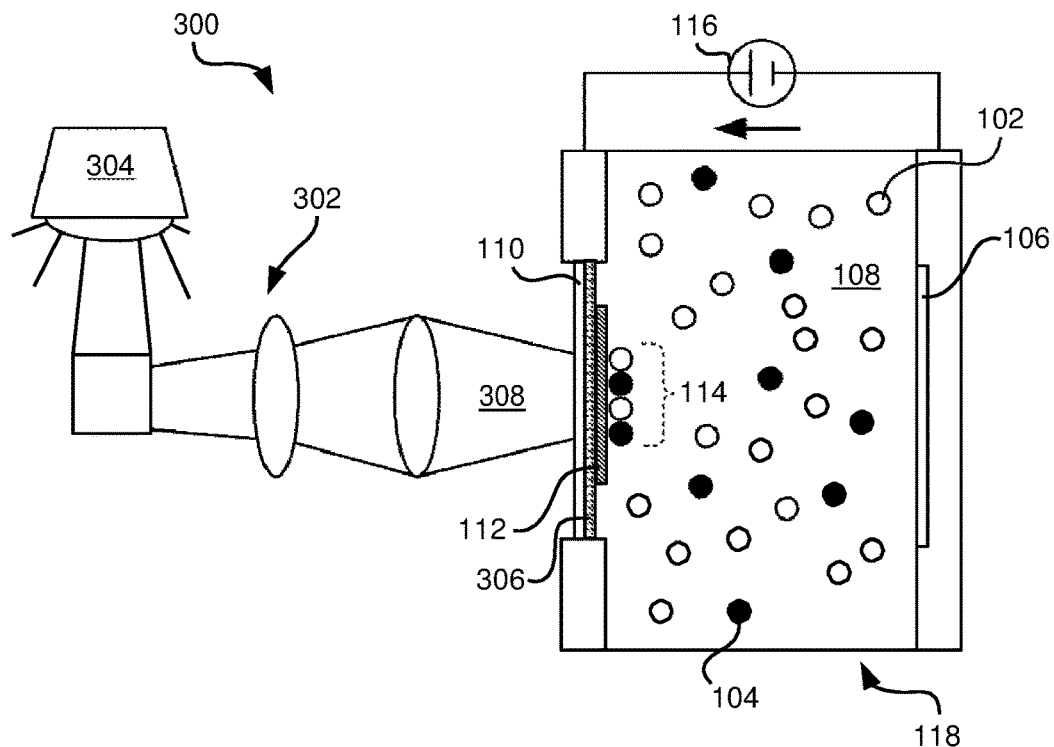
FIG. 3A is a simplified schematic diagram of an EPD device, according to one embodiment.

With reference to FIG. 3A, an EPD device 300 is shown according to one embodiment. The EPD device 300 comprises a first electrode 110 and a second electrode 106 positioned on either side of an EPD chamber 118. A circuit is provided to apply a voltage difference 116 across the two electrodes 106, 110. The EPD chamber 118 includes a solution which may comprise a solvent 108 (either aqueous or organic) and one or more materials 102 and/or 104 therein for deposition. In some embodiments, a substrate 112 may be placed on a solution side of the first electrode 110 such that the materials 114 may collect thereon.

Referring to FIG. 3A, a light source 304 may be provided to provide light 308 to a photoconductive layer 306 that becomes conductive in response to areas where the light 308 is shined thereon. In this approach, the first electrode 110 may be transparent or semi-transparent, thereby allowing light 308 from the light source 304 to reach the photoconductive layer 306. In FIG. 3A, the substrate 112 does not extend to fully cover the photoconductive layer 306, but the invention is not so limited. In this or any other embodiment, the photoconductive layer 306 may be applied to the substrate 112, to the first electrode 110, may be a separate component in the device 300, may be shaped differently or the same as any other component to which it is applied, etc.

As shown in FIG. 3A, the light 308 from the light source 304, in one embodiment, passes through a light altering mechanism 302, which may include one or more lenses or optical devices, one or more mirrors, one or more filters, one or more screens, or any other light altering mechanism as would be known to one of skill in the art that would be capable of providing one or more patterns to the light 308 (e.g., to alter the light 308 from the light source 304) prior to reaching the photoconductive layer 306, in various embodiments. In some embodiments, the light altering mechanism 302 may be capable of dynamically altering the light 308, according to user preferences, applications requirements, predefined patterns, spacings, durations, etc. According to some embodiments, light altering mechanism 302 may include a digital light processing (DLP) chip, laser scanning, light rastering, and/or a liquid crystal on silicon (LCoS) chip or array.

Figure 3B:
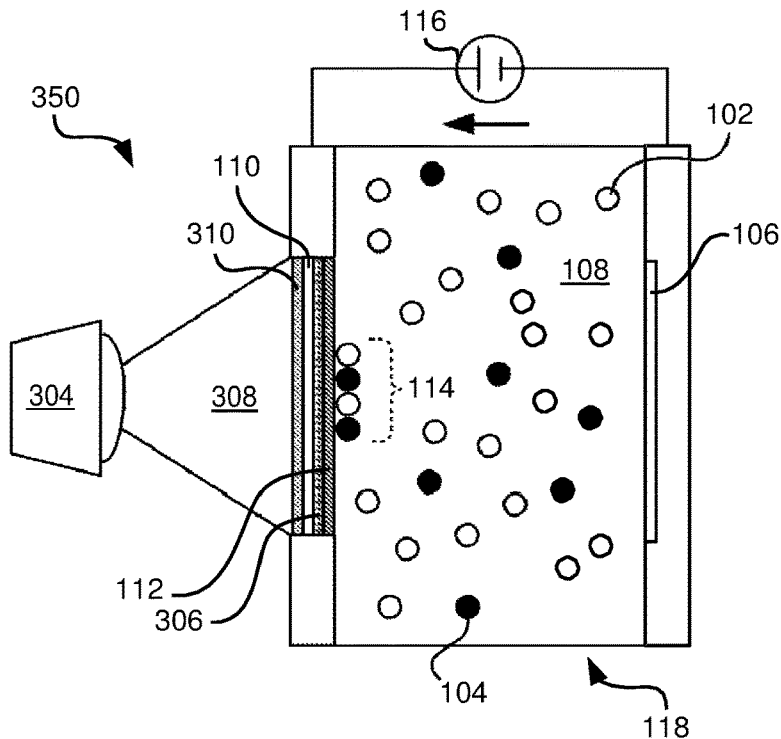
FIG. 3B is a simplified schematic diagram of an EPD device, according to one embodiment.

As shown in FIG. 3B, the EPD chamber 118 is essentially the same as in FIG. 3A, except that in FIG. 3B, the light altering mechanism 310 is positioned near to the photoconductive layer 306. Therefore, the light 308 from the light source 304, in one embodiment, passes through the light altering mechanism 310 prior to reaching the photoconductive layer 306, in one embodiment. According to several approaches, the light altering mechanism 310 may include a LCoS array, one or more filters, one or more patterned screens, or any other light altering mechanism as would be known to one of skill in the art that would be capable of providing one or more patterns to the light 308 (e.g., to alter the light 308 from the light source 304).

In these embodiments, dynamic altering of the light 308 is greatly enhanced, as the light altering mechanism may be programmed to change over time to allow light 308 to reach the photoconductive layer 306 as desired by a user.

The light source 304 may be any light source capable of providing sufficient light 308 to shine upon designated areas of the photoconductive layer 306, as would be understood by one of skill in the art upon reading the present descriptions.

Other components shown in FIGS. 3A-3B of the EPD devices 300, 350 not specifically described herein may be chosen, selected, and optimized according to any number of factors, such as size limitations, power requirements, formation time, etc., as would be known by one of skill in the art.

Figure 4:
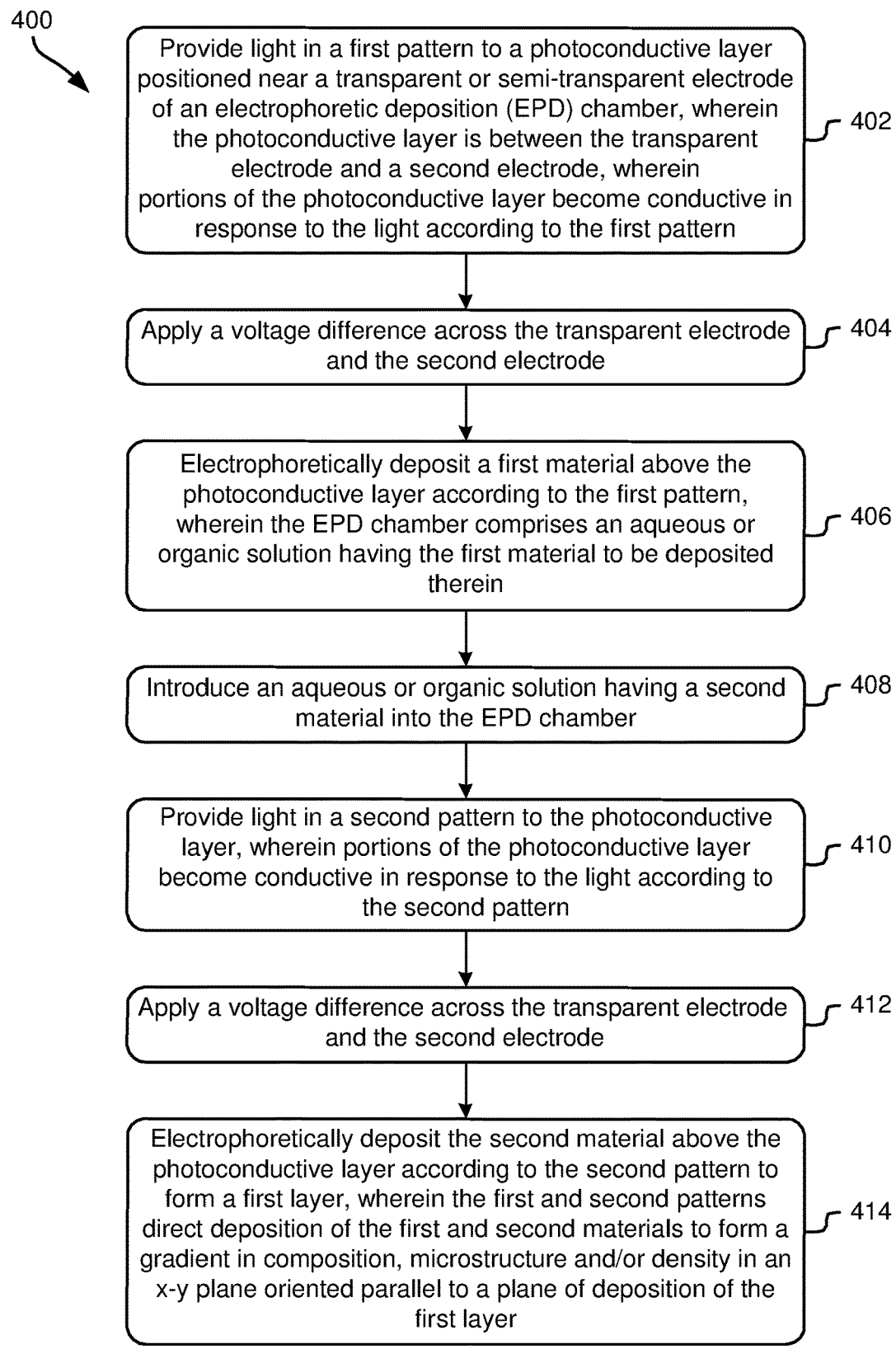
FIG. 4 is a flow diagram of a method for forming a ceramic, metal, or cermet through electrophoretic deposition, according to one embodiment.

Now referring to FIG. 4, a method 400 for forming a ceramic, metal, or cermet is shown according to one embodiment. The method 400 may be carried out in any desired environment, including those shown in FIGS. 1 and 3A-3B, among others.

In operation 402, light in a first pattern is provided to a photoconductive layer positioned near a transparent or semi-transparent electrode of an EPD chamber.

As used herein in the various embodiments, the "transparent" electrode may be or semi-transparent or semi-transparent as would be understood by one of skill in the art, the photoconductive layer is positioned between the transparent electrode and a second electrode, and portions of the photoconductive layer become conductive in response to the light according to the first pattern, in one embodiment.

In operation 404, a voltage difference is applied across the transparent electrode and the second electrode. Any method may be used for applying the voltage difference to form an electric field that causes charged particles in the solution, such as a first material, to move toward an oppositely charged electrode. For sake of simplicity, in this description, the charged particles always migrate toward the transparent (first) electrode.

In operation 406, a first material is electrophoretically deposited above the photoconductive layer according to the first pattern, wherein the EPD chamber comprises an aqueous or organic solution having the first material to be deposited therein.

In one embodiment, the method 400 further comprises the following optional operations.

In optional operation 408, an aqueous or organic solution having a second material is introduced into the EPD chamber.

In optional operation 410, light in a second pattern is provided to the photoconductive layer, wherein portions of the photoconductive layer become conductive in response to the light according to the second pattern.

In optional operation 412, a voltage difference is applied across the transparent electrode and the second electrode. This second voltage difference may be the same or different from that in operation 404, e.g., to adjust a rate of deposition.

In optional operation 414, the second material is electrophoretically deposited above the photoconductive layer according to the second pattern to form a first layer that is comprised of the first and second materials. The first and second patterns direct deposition of the first and second materials to form a gradient in composition, microstructure and/or density in an x-y plane oriented parallel to a plane of deposition of the first layer.

In one embodiment, the first pattern and/or the second pattern may be dynamically altered to modify a gradient in composition, microstructure and/or density in a z-direction across a plurality of layers, wherein the z-direction is perpendicular to the x-y plane of the first layer.

In a further embodiment, a gradient may exist in a z-direction perpendicular to the x-y plane between the first layer and a second layer formed above the first layer, the gradient being a transition from at least one of: a first composition, a first microstructure, and a first density of the first layer to at least one of: a second composition, a second microstructure, and a second density of the second layer.

According to another embodiment, the first pattern and the second pattern may be complementary to each other, as discussed previously.

In another embodiment, the method 400 may further comprise expelling the aqueous or organic solution having the first material from the EPD chamber prior to introducing the aqueous or organic solution having the second material into the EPD chamber. In this way, more abrupt transitions from the electrophoretically deposited first material to the electrophoretically deposited second material may be made, whereas slowly introducing the second material (such as in a solution having the second material therein) into the EPD chamber while the first solution is still present may result in more gradual transitions from the first material to the second material in the ceramic, metal, or cermet.

According to one approach, the first and second patterns may cause the first layer to have a gradual gradient shift in composition, microstructure, and/or density in the x-y plane of the first layer, e.g., the gradient change varies across the first layer in the x-y plane, perhaps smoothly, abruptly, in small incremental steps, etc., as would be understood by one of skill in the art upon reading the present descriptions. In one approach, the pattern may gradually be shifted from the first pattern to the second pattern to form a smooth, gradual gradient in the layer.

In another approach, the transparent electrode may have a non-planar shape, e.g., it is cylindrical, polygonal, conical, etc., as will be described in more detail in reference to FIG. 8.

According to another embodiment, field-aligned EPD may be used to align nano-rod and/or micron-scale rod particles (non-spherical particles having a longitudinal length greater than a width) of a non-cubic material as they are deposited to form a green structure. In general, the longitudinal axes of the particles become aligned with each other in the electric field extending across the EPD chamber. See, e.g., FIG. 5B, discussed below. This technique can produce transparent ceramics composed of a non-cubic material. Laser physicists and optical system engineers are currently hindered by the small subset of materials available for their designs. The only crystalline materials available to them are those that can be grown as single crystals and isotropic cubic materials which can be formed into transparent ceramics. By depositing nano-rods and/or micron-scale rods of a non-cubic material in the same orientation, the resulting green-body may be sintered to a transparent ceramic.

This approach may use very strong magnetic fields (on the order of 10 Tesla) to align particles. Micro- and nano-rod and/or micron-scale rod particles align with their longitudinal axes parallel to an applied electric field (and thus, substantially parallel to each other) due to dielectrophoretic and induced charge electrophoretic motion. Since electric dipoles are more readily induced in ceramic materials than magnetic dipoles, this method is more effective using EPD. In the EPD system, the nano-rods and/or micron-scale rods align in the electric field in suspension and retain their alignment as they are deposited on the surface.

Now referring to FIGS. 5A-5B, a ceramic 506, particularly a transparent ceramic, and a method of forming the ceramic 506 are shown according to various embodiments. FIG. 5A shows a condition when an electric field is not activated, and FIG. 5B shows a condition when the electric field is activated for a time.

Referring again to FIGS. 5A-5B, in one embodiment, the ceramic 506 comprises a plurality of layers 504 comprising particles 502 of a non-cubic material (e.g., the particles have a non-spherical shape, a non-cubic shape, etc., and do not readily form into crystal lattices). Each layer 504 is characterized by the particles 502 of the non-cubic material being aligned in a common direction, as indicated by the arrow in FIG. 5B when the electric field 116 is activated. According to a preferred embodiment, after sintering, curing, or any other process to create a ceramic or composite from the green structure shown in FIG. 5B, the ceramic may be transparent, which is difficult to achieve from non-cubic starting materials.

According to one embodiment, the plurality of layers 504 may have a characteristic of being deposited through an EPD process, as described previously. In a further embodiment, the plurality of layers 504 may have a characteristic of being deposited through the EPD process above a non-planar electrode, as will be described later in more detail.

In one approach, the starting materials, e.g., the non-cubic material comprises a plurality of particles 502, e.g., nano-rod and/or micron-scale rod particles having a longitudinal length that is at least three times longer than a width thereof, as shown in FIGS. 5A-5B.

In one preferred use, a high-powered laser may comprise the ceramic 506 (after sintering, curing, etc., thereof) as a transparent ceramic optic in the laser.

In another embodiment, non-spherical particles may be aligned within an electrophoretic field using the direct current (DC) electrophoretic field and/or an alternating current (AC) electric field applied perpendicular to a plane of deposition. In this approach, upon deposition, the non-spherical particles may form a structure with highly aligned grains. In some embodiments, highly aligned grains orientation may reduce differential indices of refraction between grains, thus rendering useful optical properties to the aligned structures.

For example, a method for forming a ceramic, particularly a transparent ceramic, from non-cubic starting material is described that may be carried out in any desired environment, including those shown in FIGS. 1 and 3A-3B, among others.

In one embodiment, a plurality of layers 504 of particles 502 of a non-cubic material are electrophoretically deposited as described previously. The particles 502 of the deposited non-cubic material are oriented in a common direction, as indicated by the arrow. The common direction may be related to a longitudinal direction of the particles 502, e.g., length of a cylinder, length of a rectangular polygon, etc.

The method may further comprise applying an alternating current (AC) electric field in a direction parallel to a plane of deposition of the plurality of layers, which is also parallel to a direction of a DC field applied during EPD, according to one embodiment.

In another embodiment, the method may further comprise sintering the plurality of layers of non-cubic material 506 to form a ceramic, wherein the non-cubic material is selected such that the ceramic is transparent.

In one approach, the plurality of layers may be deposited above a non-planar electrode, as discussed in detail later.

In one embodiment, non-cubic crystalline materials, such as hydroxyapotite, chloroapotite, alumina, etc., may be formed into crystal structures exhibiting optical properties of highly cubic structures. In this approach, non-spherical particles may be aligned and deposited in a crystal structure and possibly mixed with dopants during deposition so as to generate a smooth gradient of crystalline material with precisely known optical characteristics.

One advantage of the above described AC-EP alignment- and DC-EPD method is a significant reduction in production time for highly aligned optical crystals, whereas conventional single crystal growing methods may take several days to months to produce an aligned crystal of sufficient size for desired application, the same size and quality crystal may be generated in a matter of hours by utilizing EP alignment and deposition.

In one approach, a conductive base material such as a metal electrode may serve as a substrate for plating subsequent layers of material in complex structures defined by pattern-oriented deposition.

In another approach, a metal electrode may be replaced by a transparent or semi-transparent electrode with an attached photoconductive layer capable of being illuminated in specified regions using either a static mask or dynamic pattern from a dynamic light processing (DLP) chip, liquid crystal on silicon (LCoS), or other similar device as known in the art.

In yet another approach, a nonconductive substrate may be coated with a thin film of conductive material, such as gold, nickel, platinum, etc., as known in the art, in order to confer conductivity on the substrate and allow non-planar deposition thereupon. In this manner, virtually any substrate may be subjected to specialized modification and coating using the EPD methodology.

In another embodiment, EPD may be used with automated particle injection to control z-axis deposition and composition of a suspension solution. This technique enables production of multicomposition materials, such as opaque ceramic armor prototypes with a gradient in the properties in the z-direction from a hard strike face (boron carbide) to ductile backing (aluminum).

Figure 6:
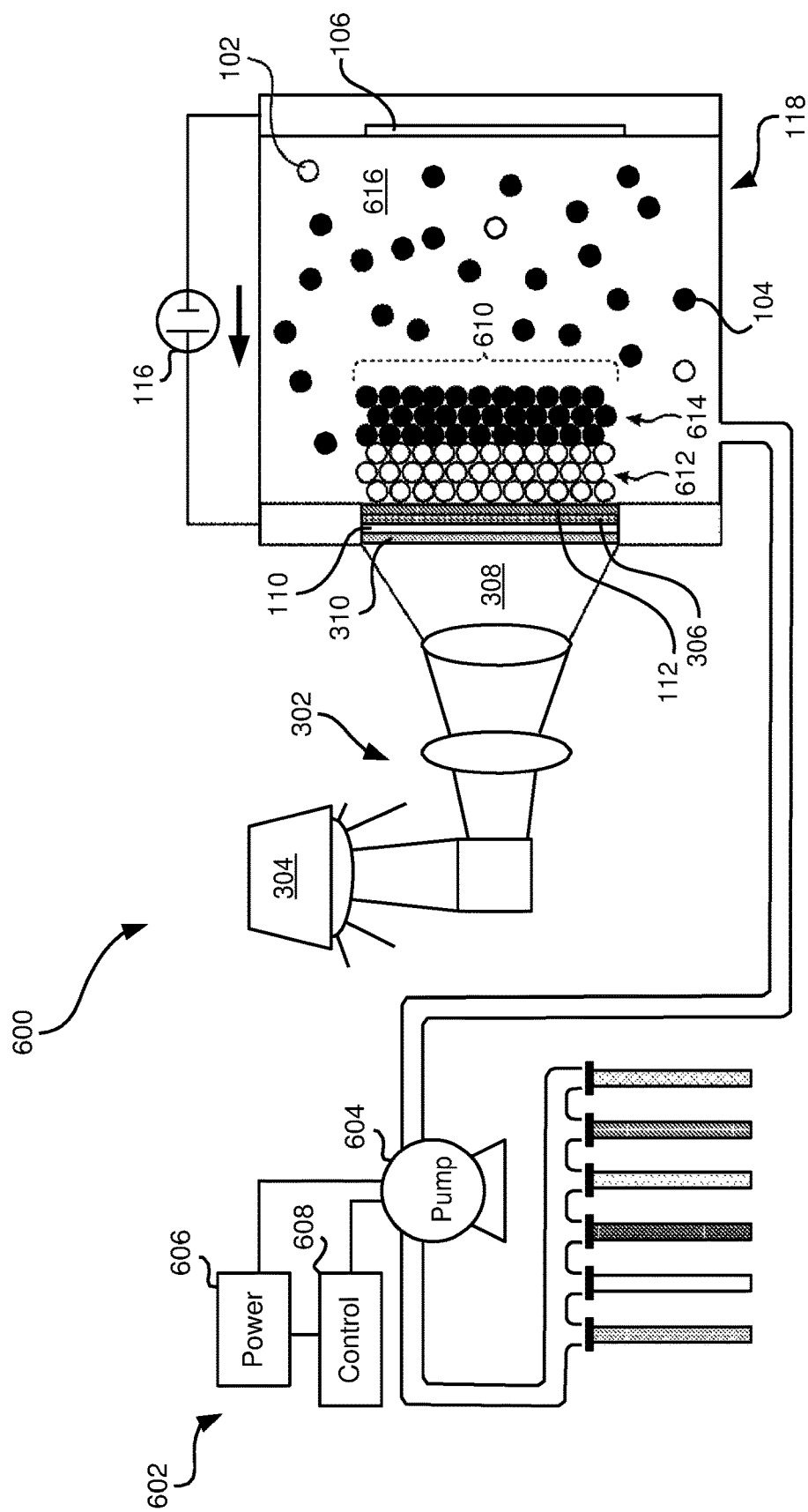
FIG. 6 is a simplified schematic diagram of an EPD device, according to one embodiment.

To control the composition of the green-body in the z-axis, the composition of the suspension may be adjusted in the EPD chamber using an automated injection system, as shown in FIG. 6, according to one embodiment. Using this technique, a sharp gradient may be formed by abruptly changing the particle solution or a smooth gradient by gradually adjusting between two particle types. Of course, more than two particle types may be used in any embodiment, and gradients between two, three, four, or greater materials may be formed using techniques described herein.

For the armor application, particles of a hard material such as $AlMgB_{14}$, $TiB_2$, SiC, boron carbide, etc. particles may be electrophoretically deposited to create a hard surface, then the solution may gradually be transitioned to include an increasing amount of relatively lighter metals or alloys such as particles of aluminum, Al—Mg, Al—Mg—Li, etc. to create a ductile backing. This transition from hard to ductile material is predicted to be an ideal composition for an efficient armor plate, as opposed to a sharp gradient.

Now referring to FIG. 6, a ceramic, metal, or cermet 610 is shown being formed using an EPD device 600 comprising an EPD chamber 118 and an automated injection system 602, according to one embodiment. Optionally, the light source 304 and accompanying light altering mechanism 306 may be included, as previously described.

The automated injection system 602, according to one embodiment, may include a pump 604, a controller 608 for controlling pump operation and particle selection, and power 606 for each component. As shown in FIG. 6, there are six particle types to choose from; however, the invention is not so limited, and any number of particle types, concentrations, sizes, etc., may be available for injecting into the EPD chamber 118, according to various embodiments.

According to one embodiment, the ceramic, metal, or cermet 610 comprises a first layer 612 having a first composition, a first microstructure, and a first density and a second layer 614 above the first layer 612, the second layer 614 having at least one of: a second composition, a second microstructure, and a second density. A gradient exists between the first layer 612 and the second layer 614, and the first and second layers 612, 614 have a characteristic of being formed in an EPD chamber, as previously described.

In one embodiment, the gradient may be a transition from at least one of: the first composition, the first microstructure, and the first density, to the at least one of: the second composition, the second microstructure, and the second density. That is to say, any of the composition, microstructure and/or density may change from the first layer 612 to the second layer 614, with any of the remaining properties being the same, according to various embodiments.

For example, and not meant to be limiting on the invention in any way, a body centered cubic (bcc) structure having a density of about 4.5 $g/cm^3$ may include a first layer having a composition of about 60% O and 40% Al in a face centered cubic (fcc) structure and a density of about 4 $g/cm^3$, and a second layer having a composition of about 50% O and 50% Al—. In this example, all three properties changed from the first layer to the second layer, but this is not required as the gradient may affect only one property, two properties, all three properties or even other properties, such as melting point, freezing point, conductivity, rigidity, or any other mechanical property, chemical property, electrical property, optical property, etc., as would be understood by one of skill in the art upon reading the present descriptions.

In another embodiment, the gradient from the first layer 612 to the second layer 614 may be abrupt, gradual, in small incremental steps, etc., as would be understood by one of skill in the art upon reading the present descriptions.

According to another embodiment, the first layer 612 and the second layer 614 may have a characteristic of being deposited above a non-planar electrode, as is described in more detail later.

In a preferred use, the ceramic, metal, or cermet 610 (after sintering, curing, etc.) may be used in an armor system as one of a plurality of armor plates. In this or any other embodiment, the first layer 612 may comprise a relatively harder, heavier material and the second layer 614 may comprise a relatively lighter material, among other rigid/flexible armor arrangements.

Figure 7:
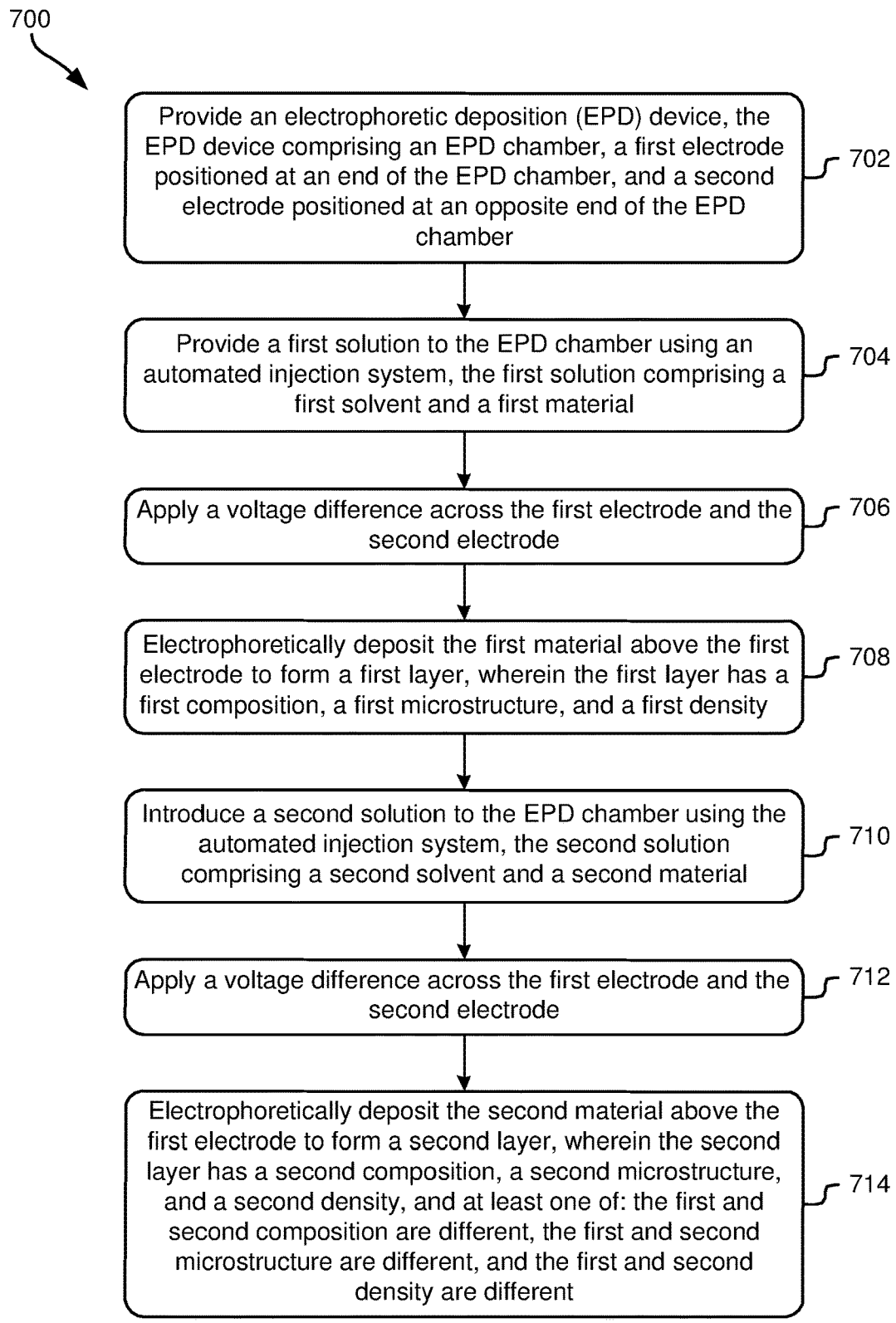
FIG. 7 is a flow diagram of a method for forming a ceramic, metal, or cermet through electrophoretic deposition, according to one embodiment.

Now referring to FIGS. 6-7, a method 700 for forming a ceramic, metal, or cermet is shown according to one embodiment. The method 700 may be carried out in any desired environment, including those shown in FIGS. 1, 3, and 6, among others. FIG. 6 is used to refer to components of the EPD device 600 according to various embodiments, and in FIG. 6, the first two layers 612, 614 of the ceramic, metal, or cermet 610 have been formed, and therefore the formation of the first layer 612 cannot be described in complete detail with reference to FIG. 6, but progresses similarly to that of the second layer 614, in some approaches.

In operation 702, an EPD device 600 is provided. The EPD device 600 comprises an EPD chamber 118, a first electrode 110 positioned at an end of the EPD chamber 118, and a second electrode 106 positioned at an opposite end of the EPD chamber 118.

In operation 704, a first solution is provided to the EPD chamber 118 using an automated injection system 602, the first solution comprising a first solvent and a first material 102.

In operation 706, a voltage difference 116 is applied across the first electrode 110 and the second electrode 106.

In operation 708, the first material 102 is electrophoretically deposited above the first electrode 110 to form a first layer 612, wherein the first layer 612 has a first composition, a first microstructure, and a first density.

In operation 710, a second solution is introduced to the EPD chamber 118 using the automated injection system 602, the second solution comprising a second solvent 616 and a second material 104.

In operation 712, a voltage difference 116 is applied across the first electrode 110 and the second electrode 106.

In operation 714, the second material 104 is electrophoretically deposited above the first electrode 110 (and possibly the first material 102) to form a second layer 614, wherein the second layer 614 has a second composition, a second microstructure, and a second density.

At least one of: the first and second composition are different, the first and second microstructure are different, and the first and second density are different, thereby defining different layers of the ceramic, metal, or cermet 610.

According to some embodiments, optional operations may be performed in addition to those in method 700. For example, in one approach, light 308 in a first pattern may be provided to a photoconductive layer 306 positioned near the first electrode 110, wherein the first electrode 110 is transparent or semi-transparent and the photoconductive layer 306 is positioned between the first electrode 110 and the second electrode 106. Portions of the photoconductive layer 306 become conductive in response to the light 308 according to the first pattern, and the first material 102 is electrophoretically deposited above the photoconductive layer 306 according to the first pattern.

In another embodiment, light 308 in a second pattern may be provided to the photoconductive layer 306 after introducing the second solution to the EPD chamber 118, wherein portions of the photoconductive layer 306 become conductive in response to the light 308 according to the second pattern, the second material 104 is electrophoretically deposited above the photoconductive layer 306 according to the second pattern, and the first and second patterns direct deposition of the first 102 and second materials 104 to form a gradient in composition, microstructure and/or density in an x-y plane oriented parallel to a plane of the photoconductive layer 306, e.g., a plane positioned perpendicular to a direction of movement of the particles caused by the voltage difference 116.

According to one embodiment, the first pattern and/or second pattern may be dynamically altered to modify a gradient in composition, microstructure and/or density in a z-direction across a plurality of layers, wherein the z-direction is perpendicular to the x-y plane.

In another embodiment, the first electrode 110 may have a non-planar shape, as described later.

In one approach, the first solvent and the second solvent may be the same and the first 102 and second materials 104 may be different, or in an alternate approach, the first solvent and the second solvent may be different and the first 102 and second materials 104 may be the same. The solvent may be used to control the deposition rate of the materials therein, according to some embodiments.

In another embodiment, a gradient exists between the first layer 612 and the second layer 614, the gradient being a transition from the first composition, the first microstructure, and the first density, to the second composition, the second microstructure, and the second density.

According to one approach, the gradient from the first layer 612 to the second layer 614 may be abrupt, gradual, comprise small incremental steps, etc.

In several embodiments, the first and second composition may be the same, the first and second microstructure may be the same, and/or the first and second density may be the same; however, as previously described, each may be different in other embodiments.

According to one approach, the method 700 may further comprise expelling the first solution from the EPD chamber 118 prior to introducing the second solution to the EPD chamber 118.

In further approaches, the first electrode may have a non-planar shape, as will be described later.

According to one approach, the first layer 612 may comprise boron carbide and the second layer 614 may comprise aluminum, or some other combination of rigid and flexible materials as would be understood by one of skill in the art.

In another embodiment, as referenced throughout, EPD with shaped graphite or machined metal electrodes with non-planar geometries may be used to create green-bodies with complex shapes. This technique can be combined with any of the previously described techniques to simultaneously achieve a defined nano- or microstructure. Potential applications include opaque ceramic armor prototypes with a radius of curvature greater than about 2 inches made from a single precursor material. Using graphite as an electrode material, complex electrode geometries may be created which provide a contour for the bulk part during deposition. Using finite element modeling as a guide, the electrode shapes and the resulting electric fields may be controlled such that they are conducive to rapid and dense deposition of material.

Figure 8C:
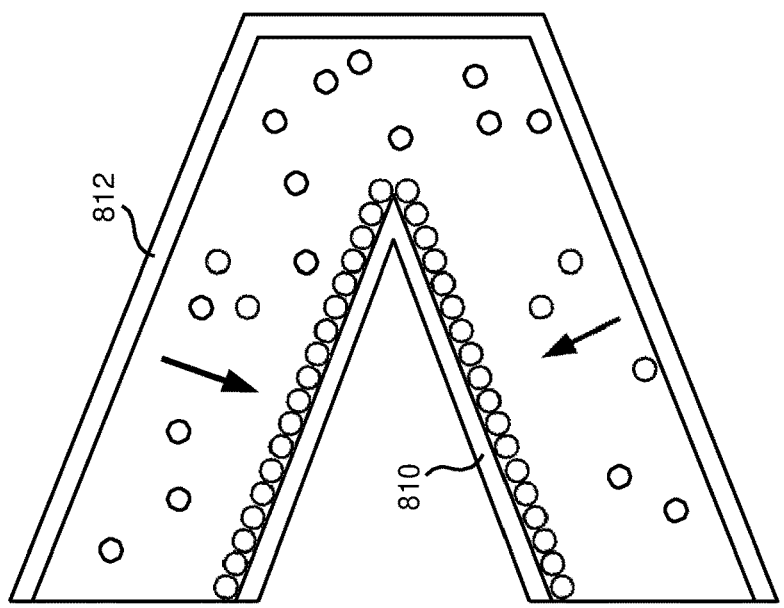
FIGS. 8A-8C show electrode configurations for EPD, according to various embodiments.
Figure 8B:
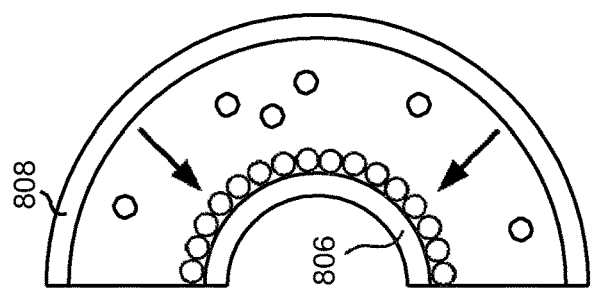
Figure 8A:
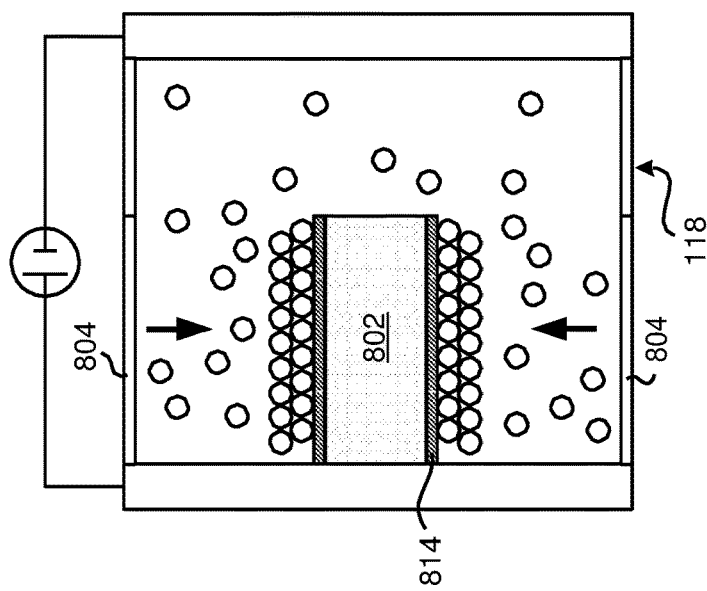

FIGS. 8A-8C show electrode configurations for EPD, according to various embodiments. In FIG. 8A, an EPD device is shown with a non-planar electrode configuration. As can be seen, the first electrode 802 extends from an end of the EPD chamber 118, while the second electrode 804 is positioned apart from the first electrode 802 at a substantially equal distance, thereby providing an electric field to cause deposition when a voltage difference is applied across the electrodes 802, 804. In this or any other embodiment, the first electrode 802 may have a circular profile, a polygonal profile, a curved profile, etc. The shape of the first electrode 802 may be chosen to correspond to a desired shape of the deposited material and subsequent structure formed therefrom in some embodiments. In some embodiments, as shown in FIG. 8A, a layer 814 may be positioned between the first electrode 802 and the second electrode 804, which may be a conductive layer, a substrate, a coating, etc., as previously described.

Now referring to FIG. 8B, the first electrode 806 may comprise a curved surface according to one embodiment, with the second electrode 808 being positioned at substantially a constant distance apart, thereby providing a more uniform electric field upon application of a voltage difference between the electrodes 806, 808. The first electrode 806 may have a continuously curved surface, or may have portions thereof that are curved, with other portions planar or flat, according to various embodiments.

As shown in FIG. 8C, according to another embodiment, the first electrode 810 may have a conical surface, which may have a circular or polygonal profile, with the second electrode 812 being positioned at about a constant distance apart.

Of course, FIGS. 8A-8C are exemplary electrode configurations, and any combination of curved, flat, circular, polygonal, or any other shape as known in the art may be used for electrode design, particularly in an attempt to adhere to application requirements, as described herein. The invention is not meant to be limited to the electrode configurations described herein, but may include electrode configurations of any type as would be understood by one of skill in the art upon reading the present descriptions. For example, deposition may be performed onto the reverse electrodes 804 (FIG. 8A), 808 (FIG. 8B), 812 (FIG. 8C), respectively.

As the embodiments described herein aptly demonstrate, the EPD methods and structures formed through the EPD methods disclosed herein, according to various embodiments, may be used for any number of novel materials and structures. According to some embodiments, the structures and methods may be used for applications including: 1) fabricating transparent ceramic optics with doping profiles tailored in three-dimensions to enable new high-powered laser designs; 2) depositing aligned particles of non-cubic ceramics to create a new family of transparent ceramics; 3) creating ceramic or cermet armor plates with complex geometries and controlled material composition for lightweight and highly effective armor designs, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for forming a ceramic, metal, or cermet using an electrophoretic deposition (EPD) device comprising an EPD chamber, a first electrode positioned toward one end of the EPD chamber, and a second electrode positioned toward an opposite end of the EPD chamber, the method comprising:

providing a first solution to the EPD chamber using an automated injection system, the first solution comprising a first solvent and a first material;

applying a first voltage difference across the first electrode and the second electrode after providing the first solution to the EPD chamber;

electrophoretically depositing the first material above the first electrode to form a first layer, wherein the first layer has a first composition, a first microstructure, and a first density;

introducing a second solution to the EPD chamber using the automated injection system, the second solution comprising a second solvent and a second material;

applying a second voltage difference across the first electrode and the second electrode after providing the second solution to the EPD chamber; and electrophoretically depositing the second material above the first electrode to form a second layer, wherein the second layer has a second composition, a second microstructure, and a second density, wherein the first and second layers form a composite layer having a gradient in at least one characteristic of the composite layer along a line extending parallel to a plane of deposition of the composite layer, the at least one characteristic being selected from the group consisting of: composition, microstructure, and density, wherein at least one of the following provisos are satisfied:

the first and second compositions are different, the first and second microstructures are different, and the first and second densities are different.

2. The method for forming a ceramic, metal, or cermet as recited in claim 1, comprising:

providing light in a first pattern to a photoconductive layer positioned near the first electrode, wherein the first electrode is transparent or semi-transparent and the photoconductive layer is between the first electrode and the second electrode, wherein portions of the photoconductive layer become conductive in response to the light according to the first pattern, and wherein the first material is electrophoretically deposited above the photoconductive layer according to the first pattern.

3. The method for forming a ceramic, metal, or cermet as recited in claim 2, comprising:

providing light in a second pattern to the photoconductive layer after introducing the second solution to the EPD chamber, wherein portions of the photoconductive layer become conductive in response to the light according to the second pattern, wherein the second material is electrophoretically deposited above the photoconductive layer according to the second pattern, and wherein the first and second patterns direct the deposition of the first and second materials to form a gradient in composition, microstructure and/or density in a direction parallel to a surface of the photoconductive layer facing the composite layer.

4. The method for forming a ceramic, metal, or cermet as recited in claim 1, wherein the first electrode has a non-planar shape.

5. The method for forming a ceramic, metal, or cermet as recited in claim 1, wherein the first solvent and the second solvent are the same and the first and second materials are different.

6. The method for forming a ceramic, metal, or cermet as recited in claim 1, wherein the first solvent and the second solvent are different and the first and second materials are the same.

7. The method for forming a ceramic, metal, or cermet as recited in claim 1, wherein a gradient exists between the first layer and the second layer, the gradient being a transition from the first composition, the first microstructure, and the first density, to the second composition, the second microstructure, and the second density.

8. The method for forming a ceramic, metal, or cermet as recited in claim 7, wherein the gradient from the first layer to the second layer is abrupt.

9. The method for forming a ceramic, metal, or cermet as recited in claim 7, wherein the gradient from the first layer to the second layer is gradual.

10. The method for forming a ceramic, metal, or cermet as recited in claim 1, wherein at least one additional characteristic of the composite layer is selected from the group consisting of: the first and second composition are the same, the first and second microstructure are the same, and the first and second density are the same.

11. The method for forming a ceramic, metal, or cermet as recited in claim 1, further comprising expelling the first solution from the EPD chamber prior to introducing the second solution to the EPD chamber.

12. The method for forming a ceramic, metal, or cermet as recited in claim 1, wherein the first layer comprises boron carbide and the second layer comprises aluminum.

13. The method for forming a ceramic, metal, or cermet as recited in claim 1, wherein the composite layer is planar.

14. A method for forming a ceramic, metal, or cermet, the method comprising:
providing an electrophoretic deposition (EPD) device comprising:
an EPD chamber;
a first electrode positioned at an end of the EPD chamber; and
a second electrode positioned at an opposite end of the EPD chamber;
providing a first solution to the EPD chamber using an automated injection system, the first solution comprising a first solvent and a first material;
applying a first voltage difference across the first electrode and the second electrode after providing the first solution to the EPD chamber;
electrophoretically depositing the first material above the first electrode to form a first layer, wherein the first layer has a first composition, a first microstructure, and a first density;
introducing a second solution to the EPD chamber using the automated injection system, the second solution comprising a second solvent and a second material;
applying a second voltage difference across the first electrode and the second electrode after providing the second solution to the EPD chamber;
electrophoretically depositing the second material above the first electrode to form a second layer, wherein the second layer has a second composition, a second microstructure, and a second density,
wherein at least one of the following provisos are satisfied:
the first and second composition are different;
the first and second microstructures are different; and
the first and second density are different;
providing light in a first pattern to a photoconductive layer positioned near the first electrode, wherein the first electrode is transparent or semi-transparent and the photoconductive layer is between the first electrode and the second electrode,
wherein portions of the photoconductive layer become conductive in response to the light according to the first pattern, and
wherein the first material is electrophoretically deposited above the photoconductive layer according to the first pattern; and
providing light in a second pattern to the photoconductive layer after introducing the second solution to the EPD chamber,
wherein portions of the photoconductive layer become conductive in response to the light according to the second pattern,
wherein the second material is electrophoretically deposited above the photoconductive layer according to the second pattern, and
wherein the first and second patterns direct the deposition of the first and second materials to form a gradient in composition, microstructure and/or density in an x-y plane oriented parallel to a plane of the photoconductive layer,
wherein the first pattern and/or the second pattern are dynamically altered to modify a gradient in composition, microstructure and/or density in a z-direction across a plurality of layers, wherein the z-direction is perpendicular to the x-y plane.

15. A method for forming a ceramic, metal, or cermet using an electrophoretic deposition (EPD) device comprising an EPD chamber, a first electrode positioned at an end of the EPD chamber, and a second electrode positioned at an opposite end of the EPD chamber, the method comprising:
providing a first solution to the EPD chamber using an automated injection system, the first solution comprising a first solvent and a first material;
applying a first voltage difference across the first electrode and the second electrode for electrophoretically depositing the first material above the first electrode;
introducing a second solution to the EPD chamber using the automated injection system, the second solution comprising a second solvent and a second material; and
applying a second voltage difference across the first electrode and the second electrode for electrophoretically depositing the second material above the first electrode to form a layer having both the first and second materials,
the layer having a defined gradient in at least one characteristic thereof as measured along a line extending parallel to a plane of deposition of the layer,
the characteristic being selected from the group consisting of: composition, microstructure, and density.

16. The method for forming a ceramic, metal, or cermet as recited in claim 15, comprising:
providing light in a first pattern to a photoconductive layer positioned near the first electrode, wherein the first electrode is at least semi-transparent and the photoconductive layer is between the first electrode and the second electrode,
wherein portions of the photoconductive layer become conductive in response to the light according to the first pattern, and
wherein the first material is electrophoretically deposited above the photoconductive layer according to the first pattern.

17. The method for forming a ceramic, metal, or cermet as recited in claim 15, wherein the layer is planar.

18. The method for forming a ceramic, metal, or cermet as recited in claim 15, wherein the layer has a defined gradient in at least two of the characteristics.

* * * * *